United States Patent [19]

Fielder et al.

[11] Patent Number: 5,142,656

[45] Date of Patent: Aug. 25, 1992

[54] LOW BIT RATE TRANSFORM CODER, DECODER, AND ENCODER/DECODER FOR HIGH-QUALITY AUDIO

[75] Inventors: Louis D. Fielder, Millbrae; Grant A. Davidson, Oakland, both of Calif.

[73] Assignee: Dolby Laboratories Licensing Corporation, San Francisco, Calif.

[21] Appl. No.: 787,541

[22] Filed: Nov. 4, 1991

Related U.S. Application Data

[60] Division of Ser. No. 458,894, Dec. 29, 1989, Pat. No. 5,109,417, which is a continuation-in-part of Ser. No. 303,714, Jan. 27, 1989, abandoned, and a continuation-in-part of Ser. No. 439,868, Nov. 20, 1989, abandoned.

[51] Int. Cl.$^5$ .............................................. G10L 5/00
[52] U.S. Cl. ....................................................... 381/37
[58] Field of Search ...................................... 381/31-38; 370/111; 375/122

[56] References Cited

U.S. PATENT DOCUMENTS

| | | |
|---|---|---|
| 4,093,989 | 6/1978 | Flink . |
| 4,464,783 | 8/1984 | Beraud . |
| 4,516,258 | 5/1985 | Ching . |
| 4,703,480 | 10/1987 | Cameron et al. ............. 370/111 |

FOREIGN PATENT DOCUMENTS

| | | |
|---|---|---|
| 0176243 | 4/1986 | European Pat. Off. . |
| 0193143 | 9/1986 | European Pat. Off. . |
| 0217017 | 8/1987 | European Pat. Off. . |
| 0251028 | 1/1988 | European Pat. Off. . |
| 3440613 | 4/1986 | Fed. Rep. of Germany . |
| 3639753 | 9/1988 | Fed. Rep. of Germany . |
| 8700723 | of 0000 | World Int. Prop. O. . |

OTHER PUBLICATIONS

Zwicker, "Letters to the Editor: Subdivision of the Audible Frequency Range into Critical Bands", *J. Acoust. Soc. Am.*, vol. 33, Feb. 1961, p. 248.
Cooley, Tukey, "An Algorithm for the Machine Calculation of Complex Fourier Series", *Math. Compt.*, vol. 19, 1965, pp. 297-301.
Jeffress, "Masking", *Foundations of Modern Auditory Theory*, J. V. Tobias ed., New York: Academic Press, 1970, vol. I, pp. 87-94.
Parks, McClellan, "Chebyshev Approximation for Nonrecursive Digital Filters with Linear Phase", *IEEE Trans.*, vol. CT-19, Mar. 1972, pp. 189-194.
Brigham, *The Fast Fourier Transform*, Englewood Cliffs, N.J.: Prentice-Hall, Inc. 1974, pp. 166-169.
Crochiere, Webber, Flanagan, "Digital Coding of Speech in Sub-bands", *Bell System Tech. J.*, vol. 55, pp. 1069-1085, Oct. 1976.
Lee, Lipschutz, "Floating-Point Encoding for Transcription of High-Fidelity Audio Signals", *J. Audio Eng. Soc.*, vol. 25, May 1977, pp. 266-272.
Harris, "On the Use of Windows for Harmonic Analysis With the Discrete Fourier Transform", *Proc. IEEE*, vol. 66, Jan. 1978, pp. 51-83.
Tribolet, Crochiere, "Frequency Domain Coding of Speech", *IEEE Trans. Acoust., Speech, and Signal Proc.*, vol. ASSP-27, Oct. 1979, pp. 512-530.
Crochiere, "A Weighted Overlap-Add Method of Short-Time Fourier Analysis/Synthesis", *IEEE Trans. ASSP.*, vol. ASSP-28, Feb. 1980, pp. 99-102.
Smith, *Digital Transmission Systems*, New York, N.Y.: Van Nostrand Reinhold Co., 1985, pp. 228-236.
Peterson, Weldon, *Error-Correcting Codes*, Cambridge, Mass: The M.I.T. Press, 1986, pp. 269-309, 361-362.
Princen, Bradley, "Analysis/Synthesis Filter Bank Design Based on Time Domain Aliasing Cancellation", *IEEE ASSP.*, vol. ASSP-34, Oct. 1986, pp. 1153-1161.

(List continued on next page.)

*Primary Examiner*—Emanuel S. Kemeny
*Attorney, Agent, or Firm*—Thomas A. Gallagher; David N. Lathrop

[57] ABSTRACT

A transform encoder, a transform decoder, and a transform encoder/decoder system employ adaptive bit allocation wherein each code word representing spectral information is allocated a fixed number of bits and an adaptive number of bits, except that at least some but not all code words are allocated a fixed number of bits.

24 Claims, 25 Drawing Sheets

OTHER PUBLICATIONS

Stoll, Theile, "New Digital Sound Transmission Methods—How is Sound Quality Assessed", *Report, 14th Meeting of Audio Engineers*, Munich, Nov. 1986.

Brandenburg, "OCF—A New Coding Algorithm for High Quality Sound Signals", *IEEE Int. Conf. on Acoust., Speech, and Signal Proc.*, 1987, pp. 141-144.

Princen, Johnson, Bradley, "Subband/Trasnsform Coding Using Filter Bank Designs Based on Time Domain Aliasing Cancellation", ICASSP, May, 1987, pp. 2161-2164.

Johnson, Bradley, "Adaptive Transform Coding Incorporating Time Domain Aliasing Cancellation", *Speech Communications.*, vol. 6, 1987, pp. 299-308.

Fielder, "Evaluation of the Audible Distortion and Noise Produced by Digital Audio Converters", *J. Audio Eng. Soc.*, vol. 35, Jul. 1987, pp. 517-534.

Schroeder, Platte, Krahe, "'MSC': Stereo Audio Coding with CD-Quality and 256 kBit/Sec", *IEEE Trans.*, vol. CE-33, Nov., 1987, pp. 512-519.

*Audio Engineering Handbook*, K. B. Benson ed., San Francisco: McGraw-Hill, 1988, pp. 1.40-1.42, 4.8-4.10.

Johnston, "Transform Coding of Audio Signals Using Perceptual Noise Criteria", *IEEE J. on Selected Areas in Comm.*, vol. 6, Feb. 1988, pp. 314-323.

Brandenburg, Kapust, et al., "Real-Time Implementation of Low Complexity Transform Coding", *AES Convention Preprint* 2581, 84th Convention, Paris, 1988.

Brandenburg, "High Quality Sound Coding at 2.5 Bit/Sample", *AES Convention Preprint No.* 2582, 84th Convention, Paris, 1988.

Lookabaugh, "Variable Rate and Adaptive Frequency Domain Vector Quantization of Speech", PhD Dissertation, Stanford University Jun. 1988, pp. 166-182.

Brandenburg, Kapust, et al., "Low Bit Rate Codecs for Audio Signals Implementation in Real Time", *AES Preprint* 2707, 85th Convention, Nov. 1988.

Brandenburg, Seitzer, "PCF: Coding High Quality Audio with Data Rates of 64 kBit/Sec", *AES Preprint* 2723, 85th Convention, Los Angeles, Nov. 1988.

Orglmeister, "Data Reduction in High-Quality Audio Signals", *AES Convention Preprint No.* 2751, 86th Convention, Hamburg, Mar. 1989.

Feiten, "Spectral Properties of Audio Signals and Masking with Aspect to Bit Data Reduction", *AES Preprint* 2795, 86th Convention, Hamburg, Mar. 1989.

Lookabaugh, Perkins, "Application of the Princen-—Bradley Filter Bank to Speech and Image Compression", Apr. 1989.

Reynolds, Smith, "Analysis/Synthesis Image Coding System Based on Time Domain Aliasing Cancellation", *IEEE Proc.*, 1989 Southeastcon, Apr. 1989, pp. 866-871.

Edler, "Coding of Audio Signals with Overlapping Block Transform and Adaptive Window Functions", *Frequenz*, vol. 43, No. 9, 1989, pp. 252-256.

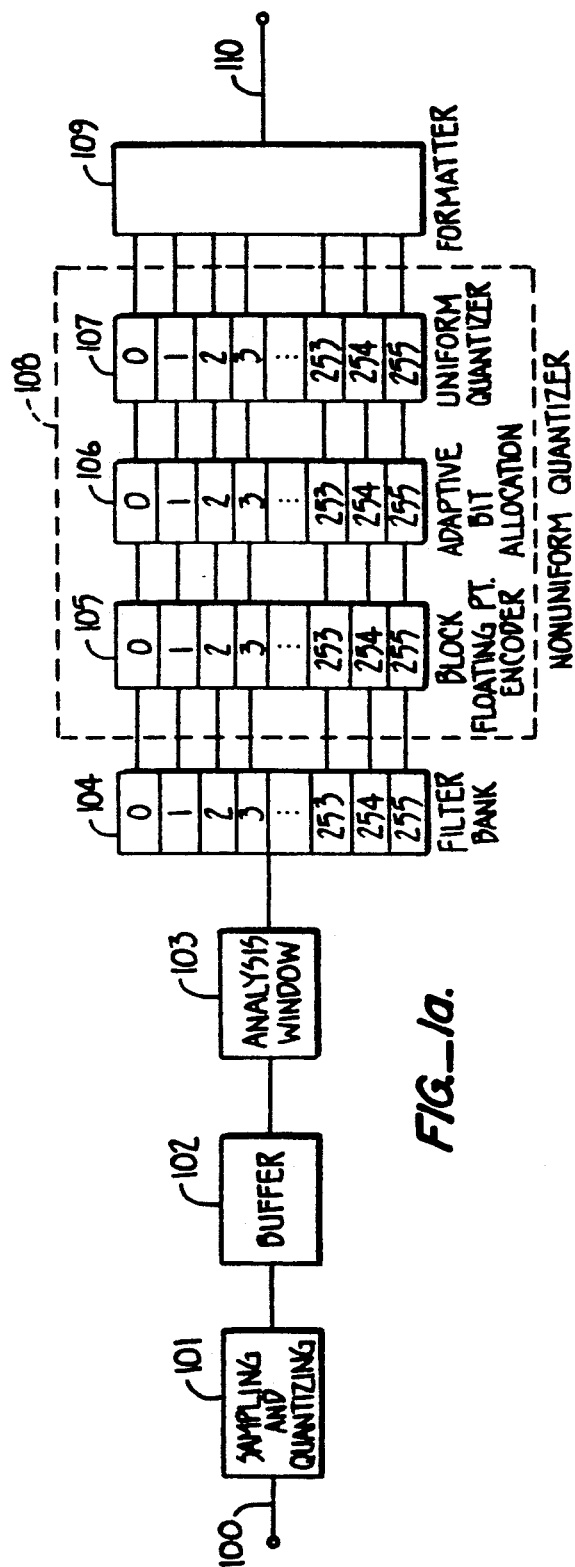
FIG._1a.
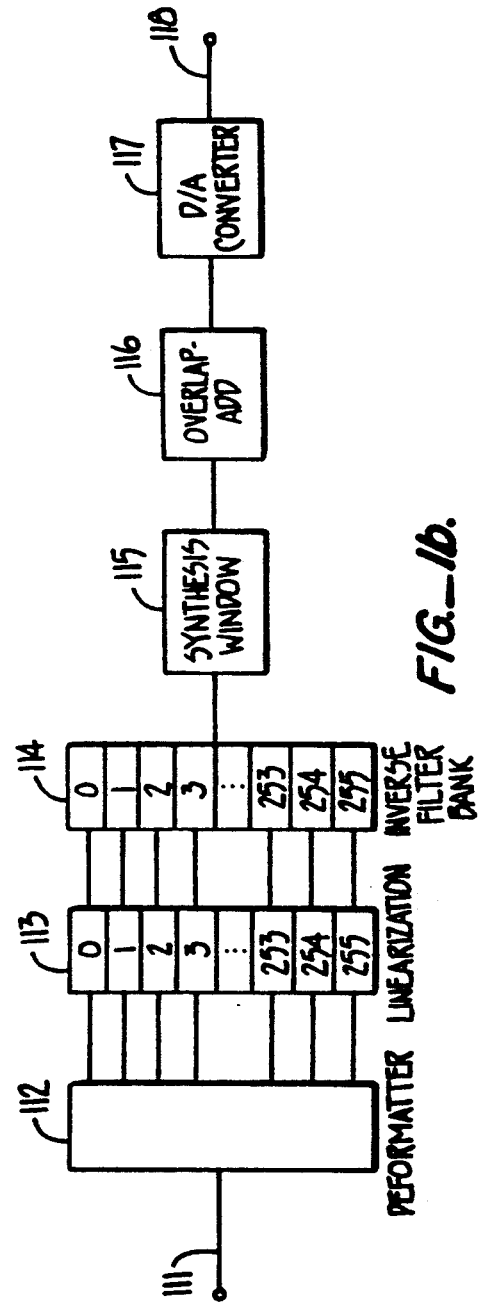
FIG._1b.

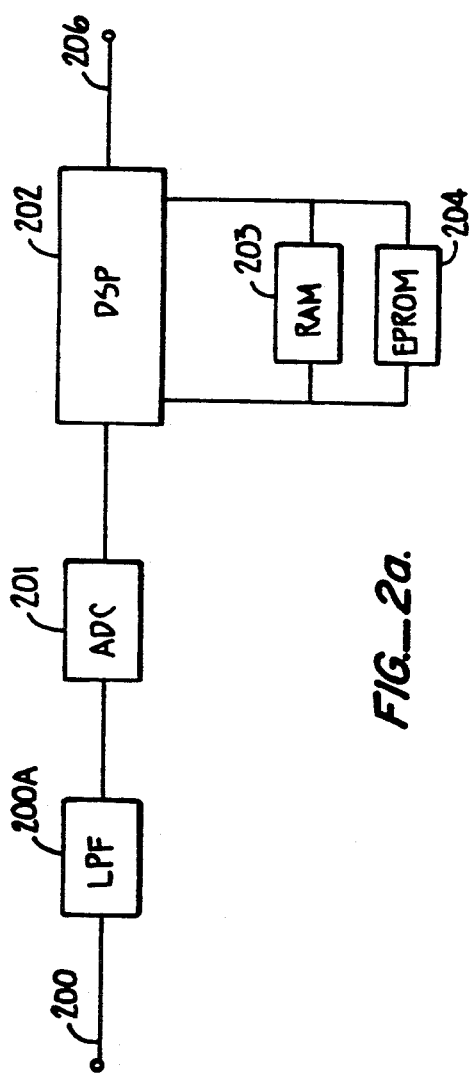
FIG._2a.
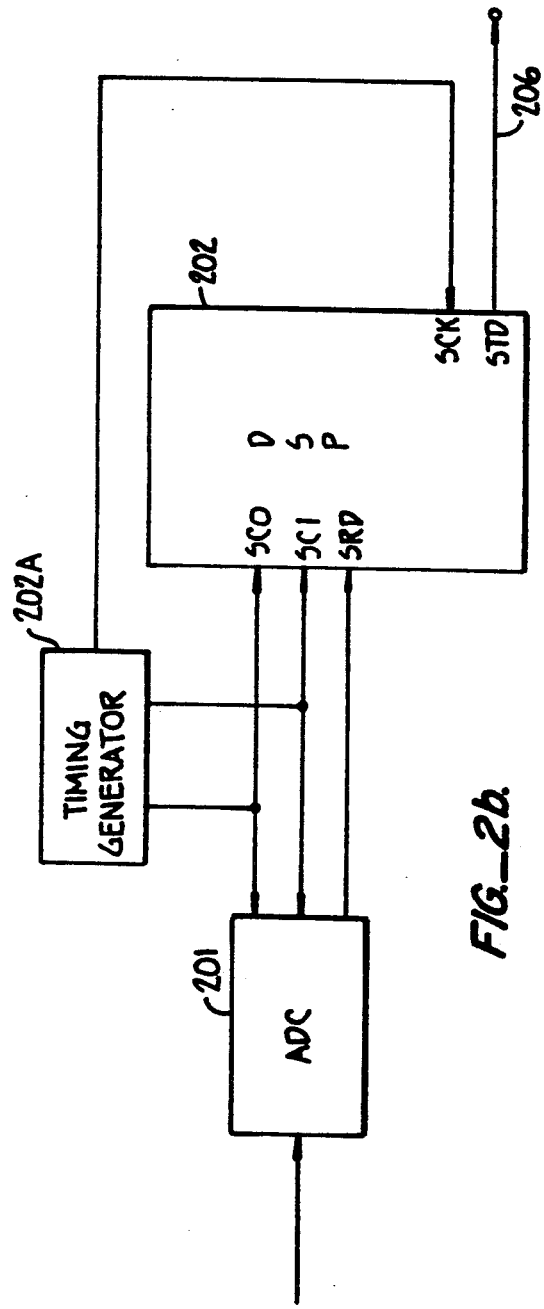
FIG._2b.

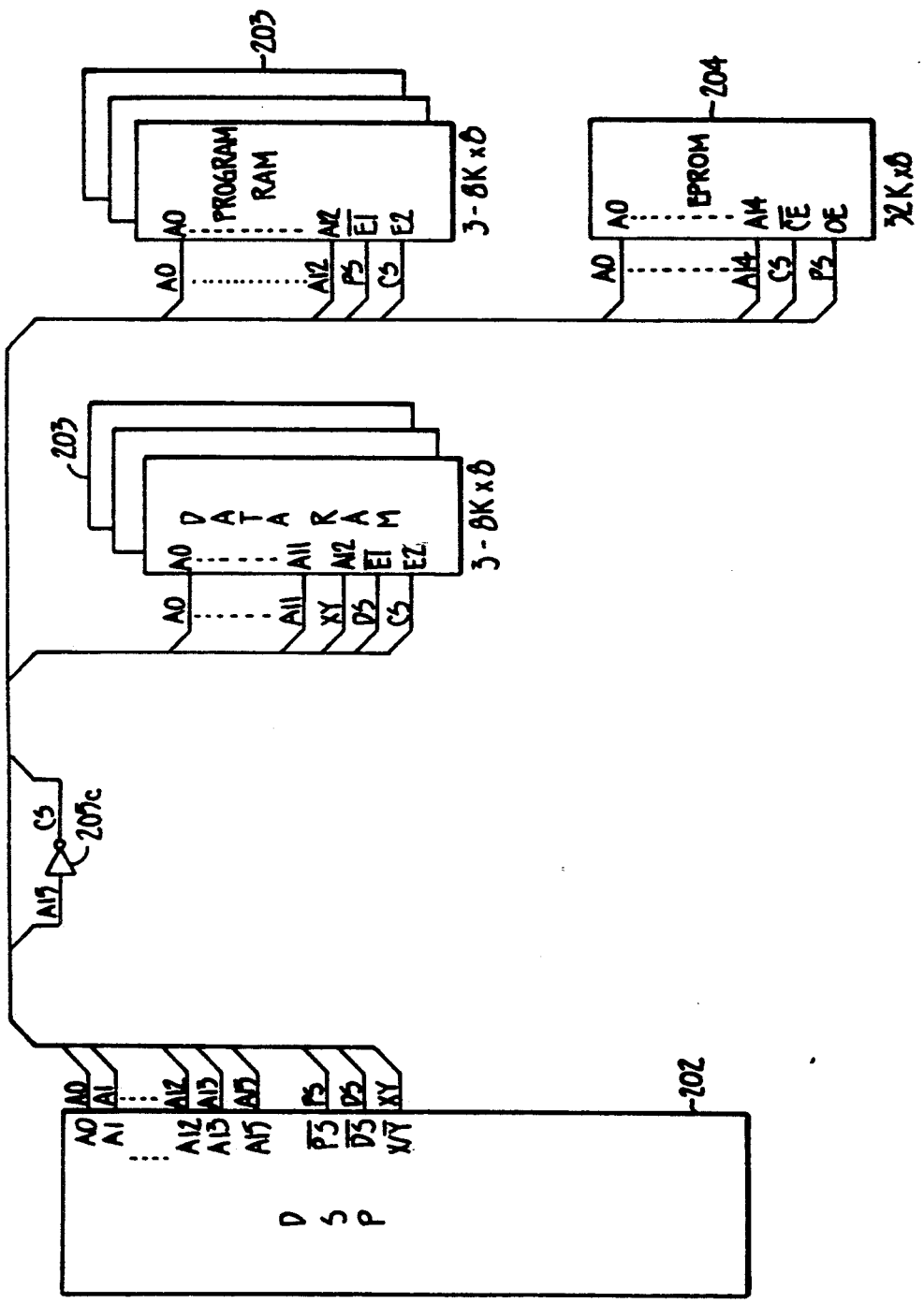
FIG._2c.

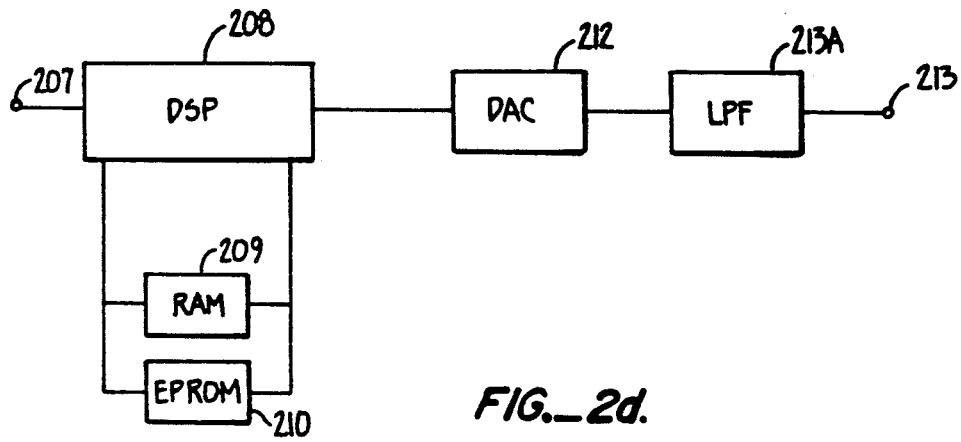
FIG._2d.
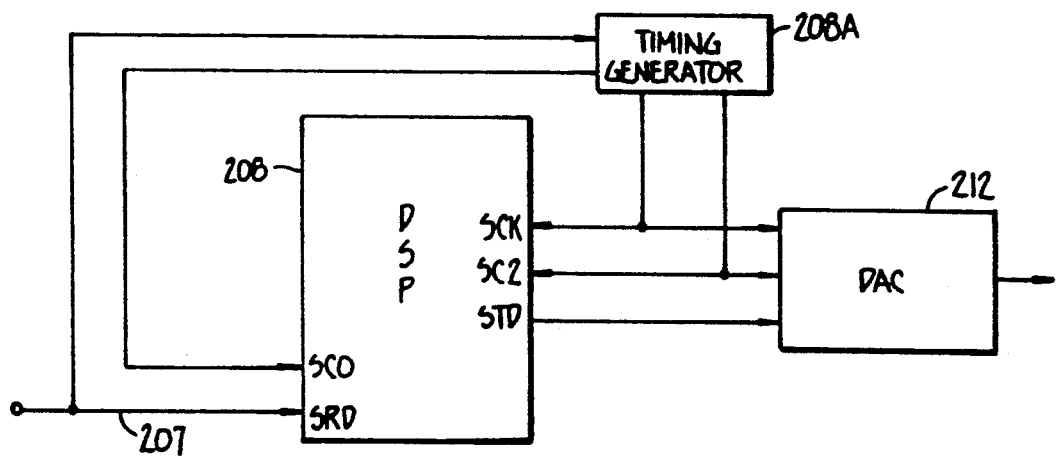
FIG._2e.

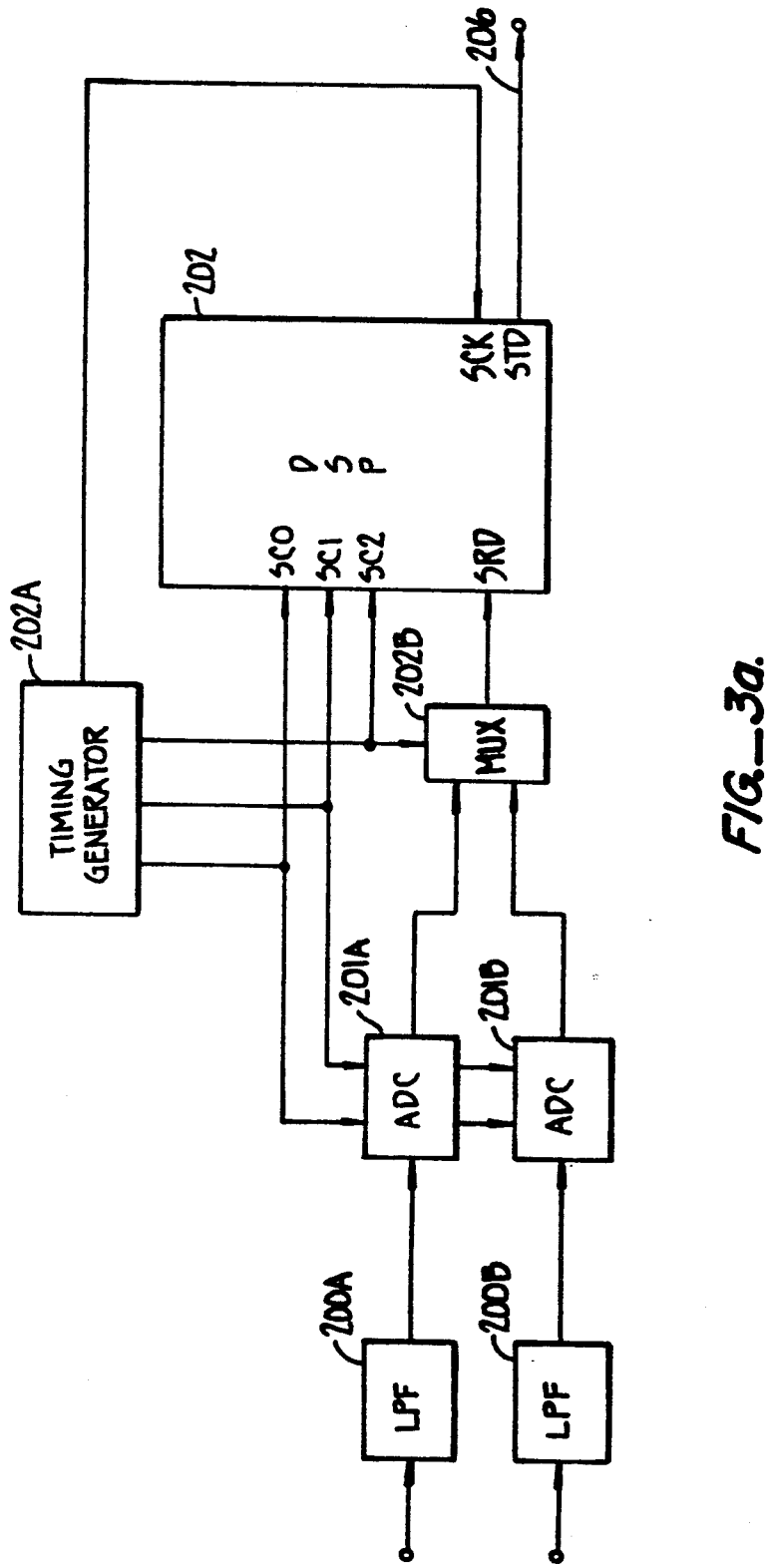
FIG_3a.

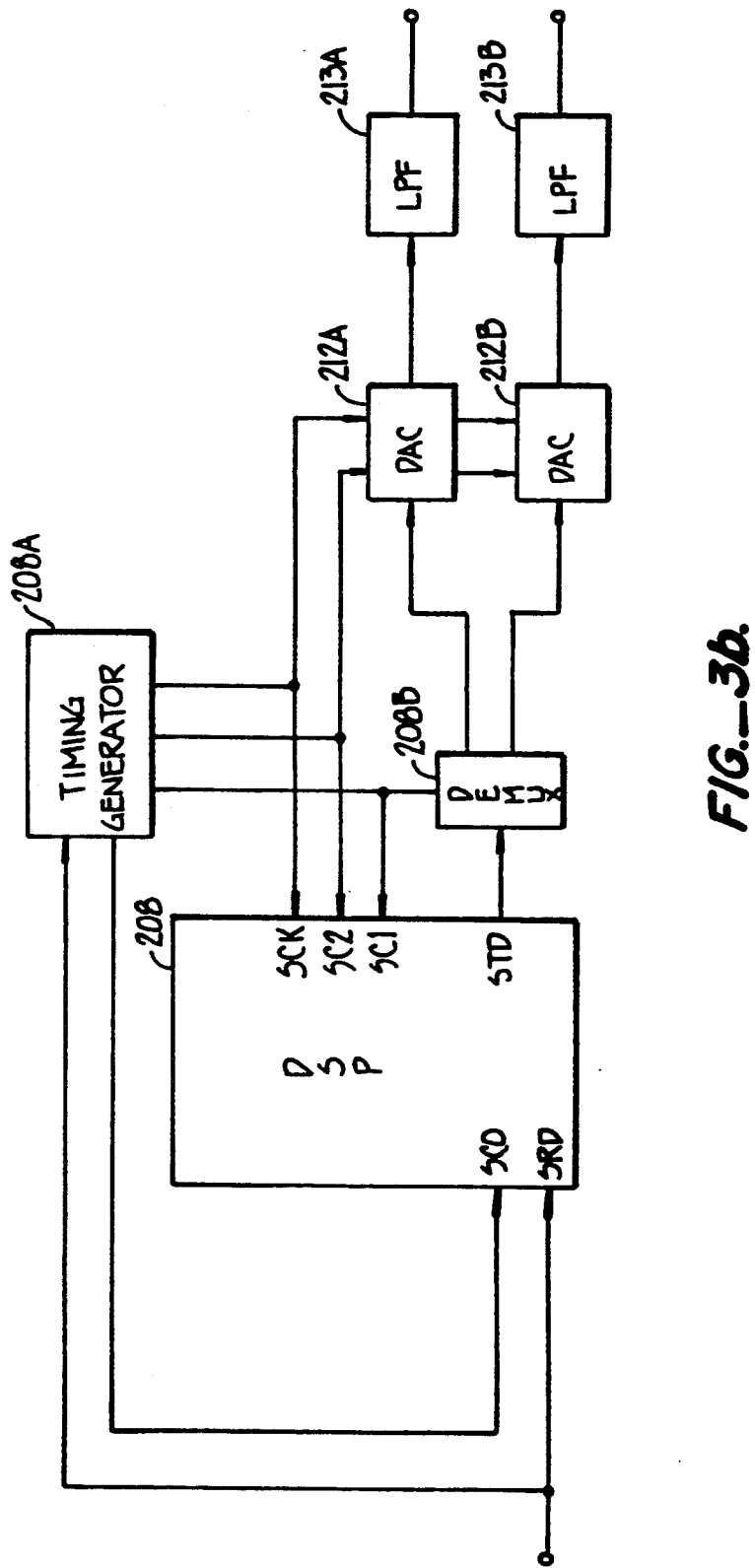
FIG._3b.

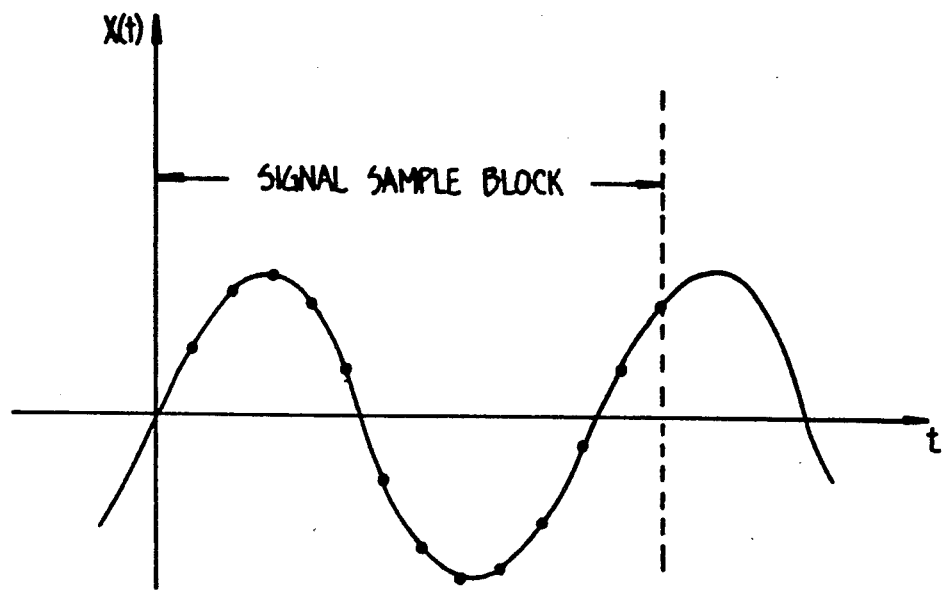
FIG._4.
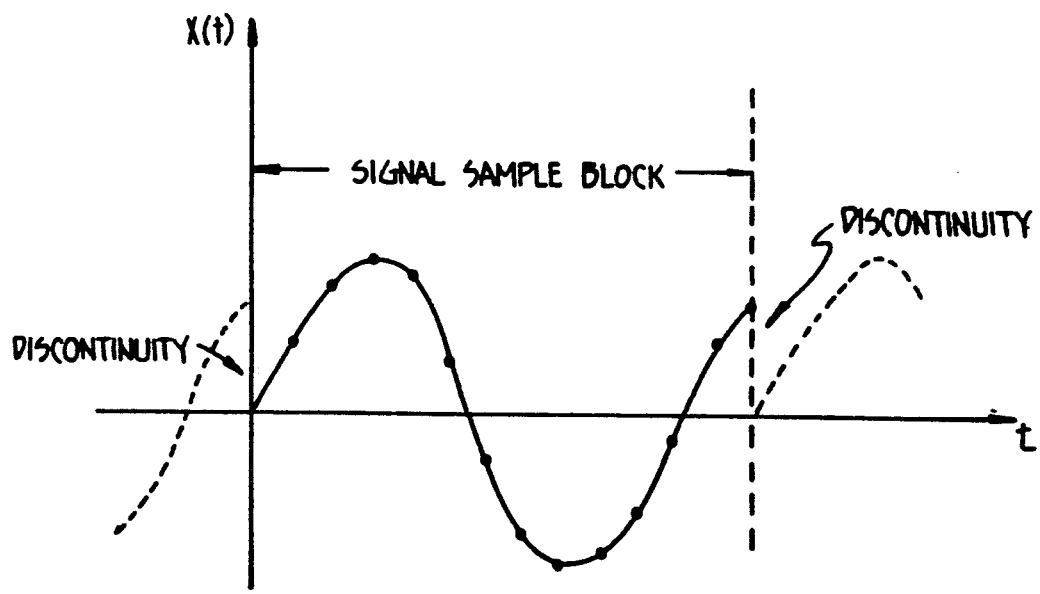
FIG._5.

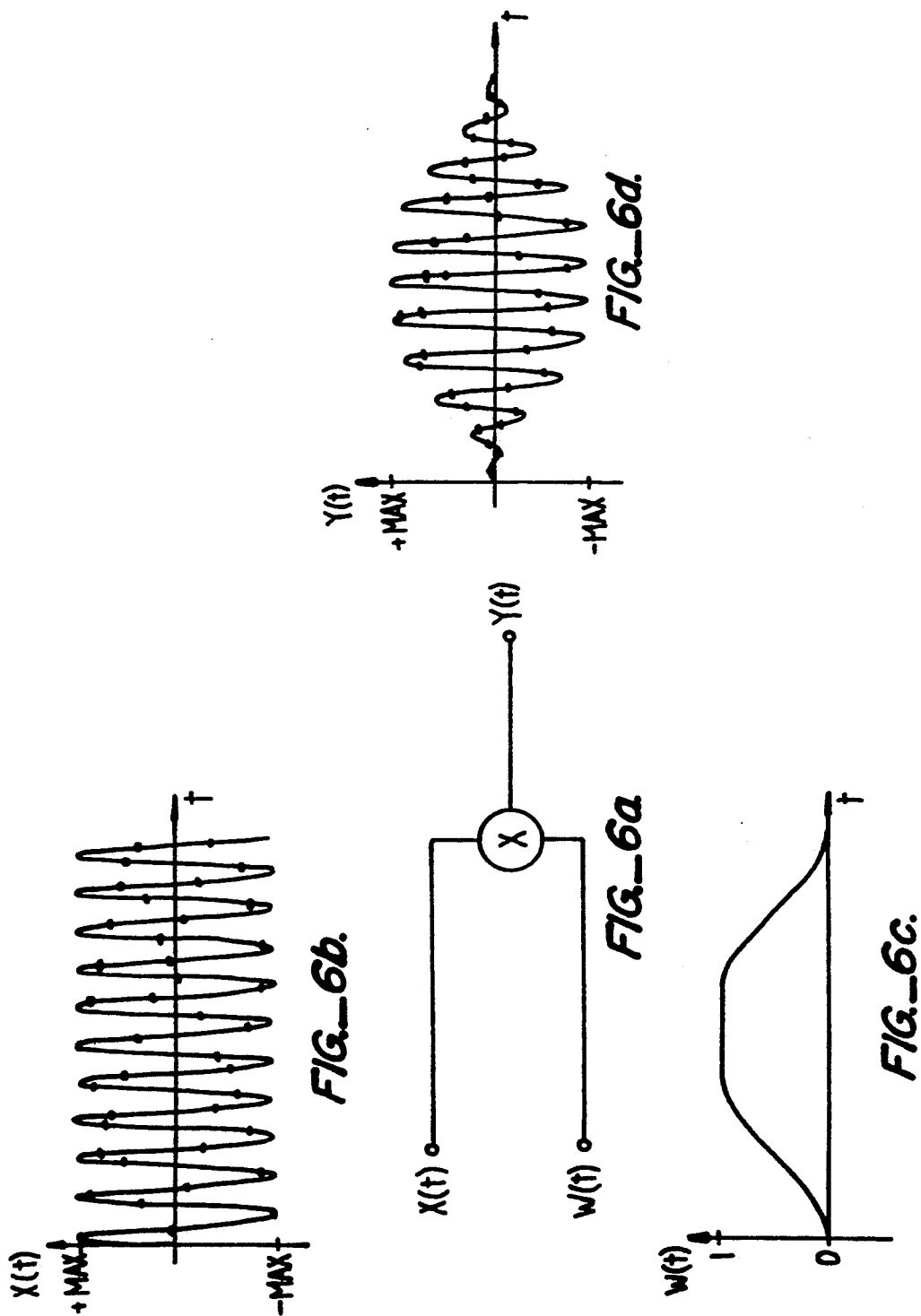

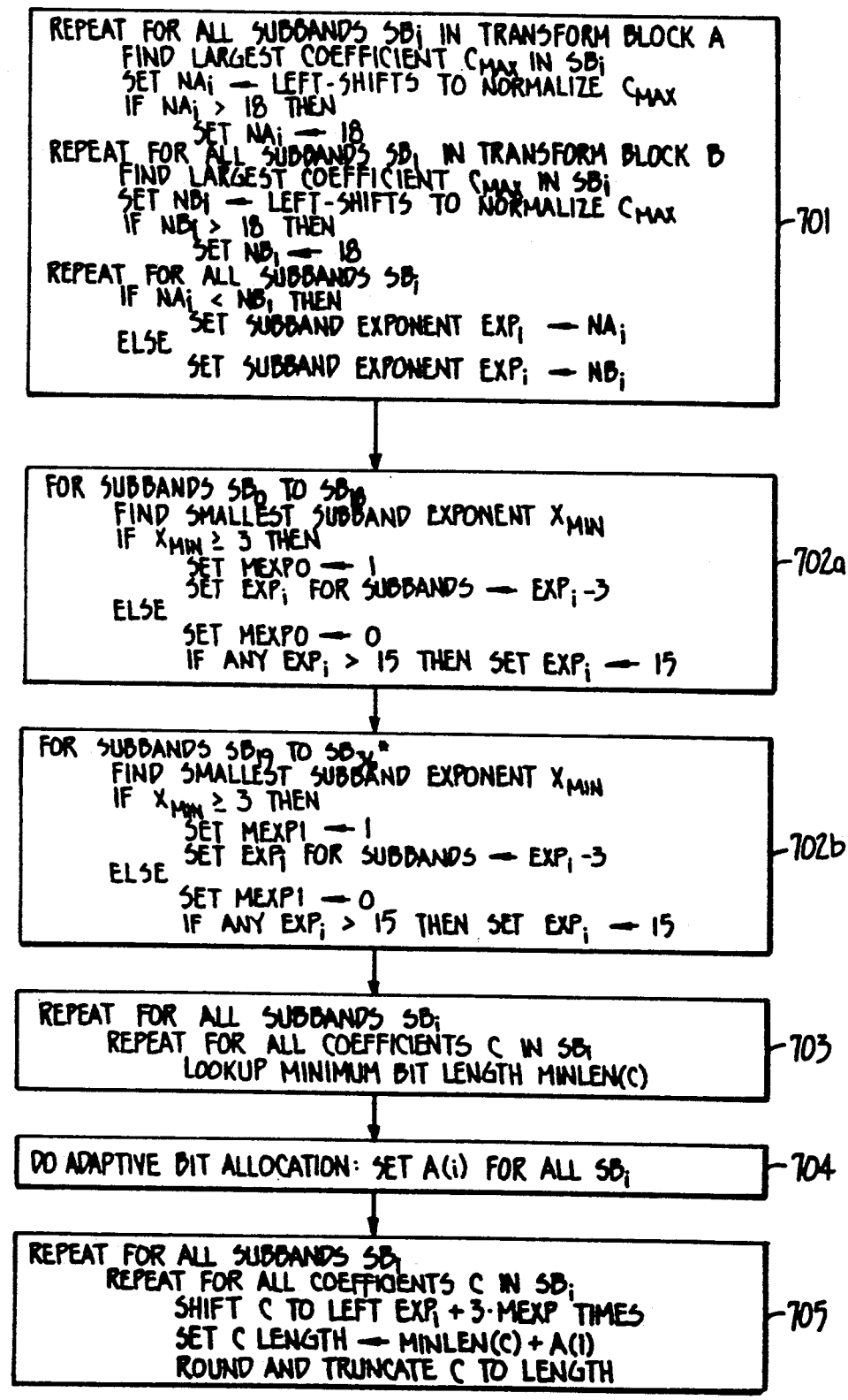
FIG._7.

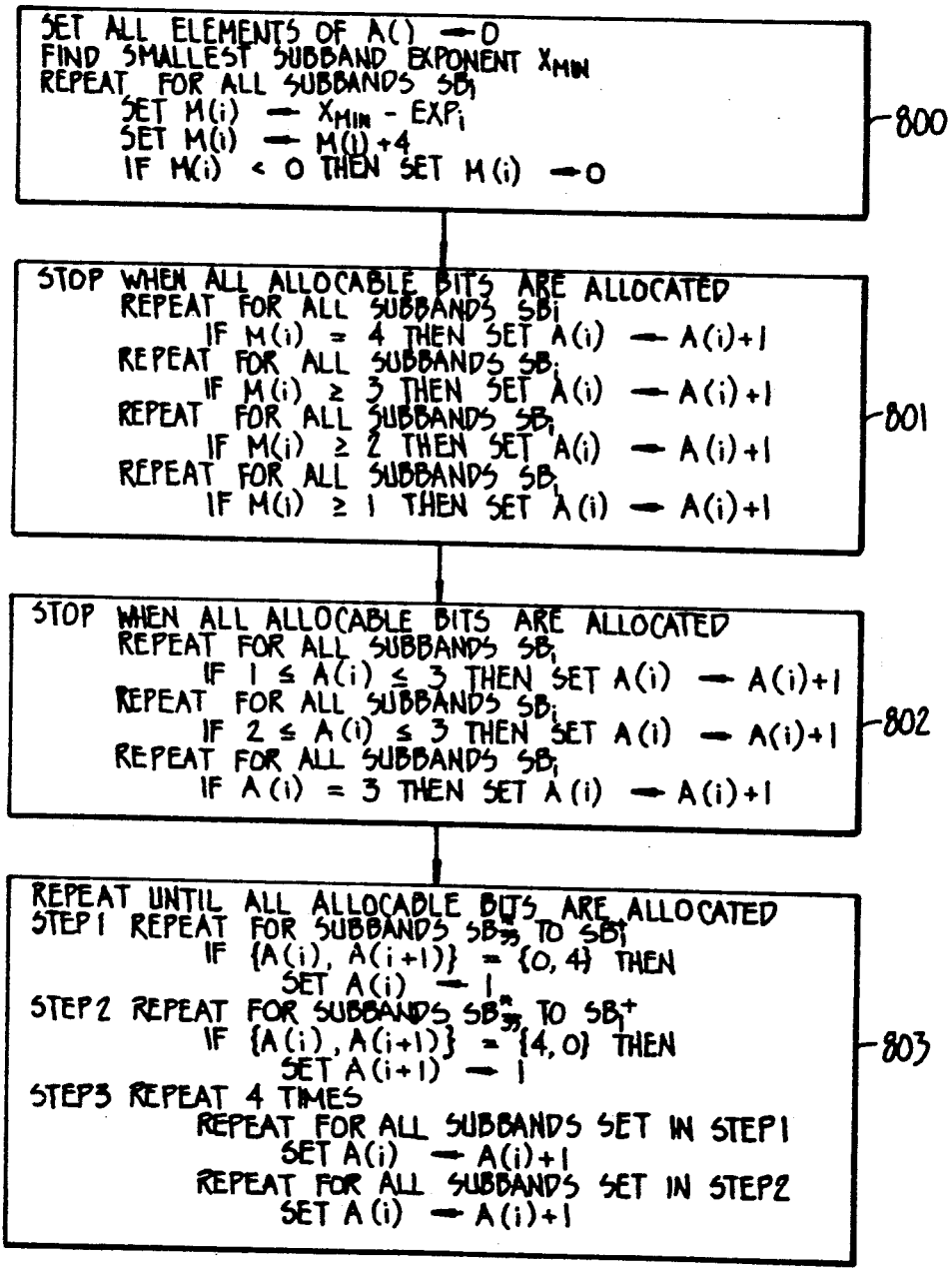
FIG._8.

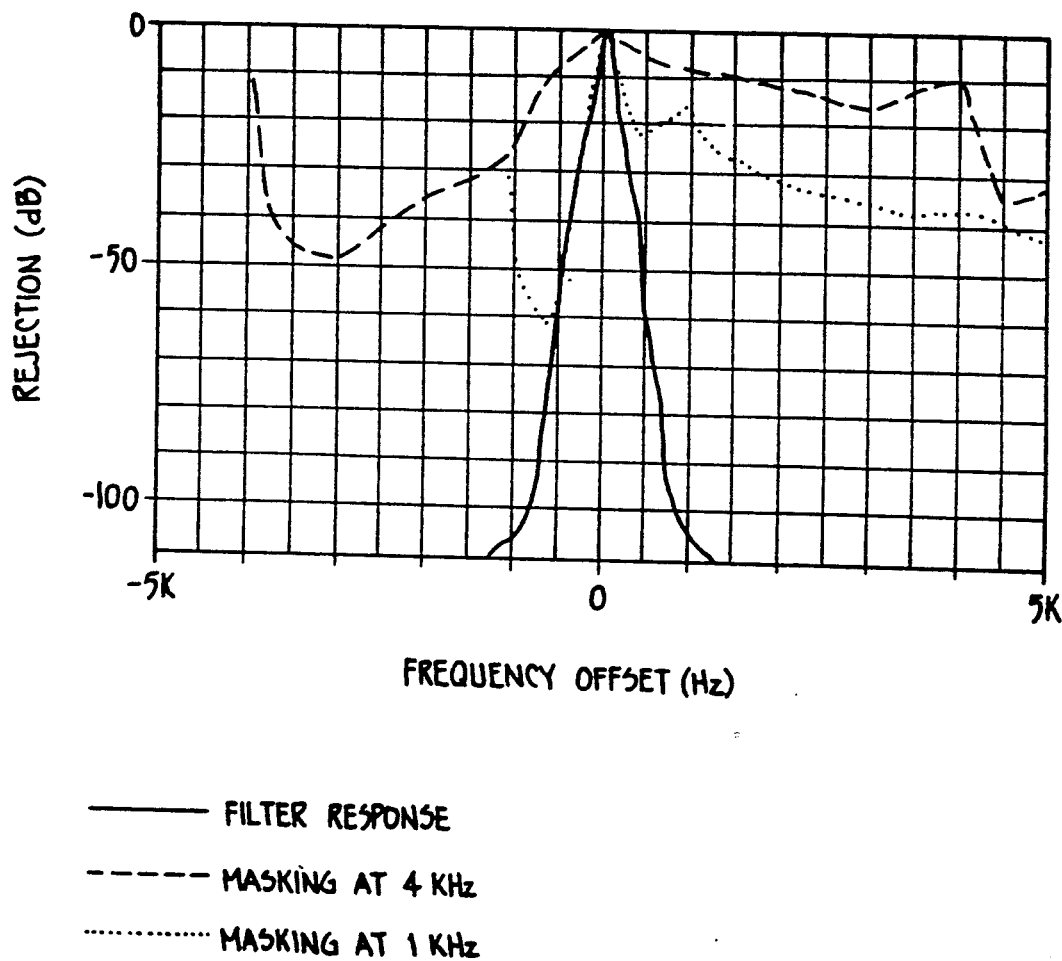
FIG._9.

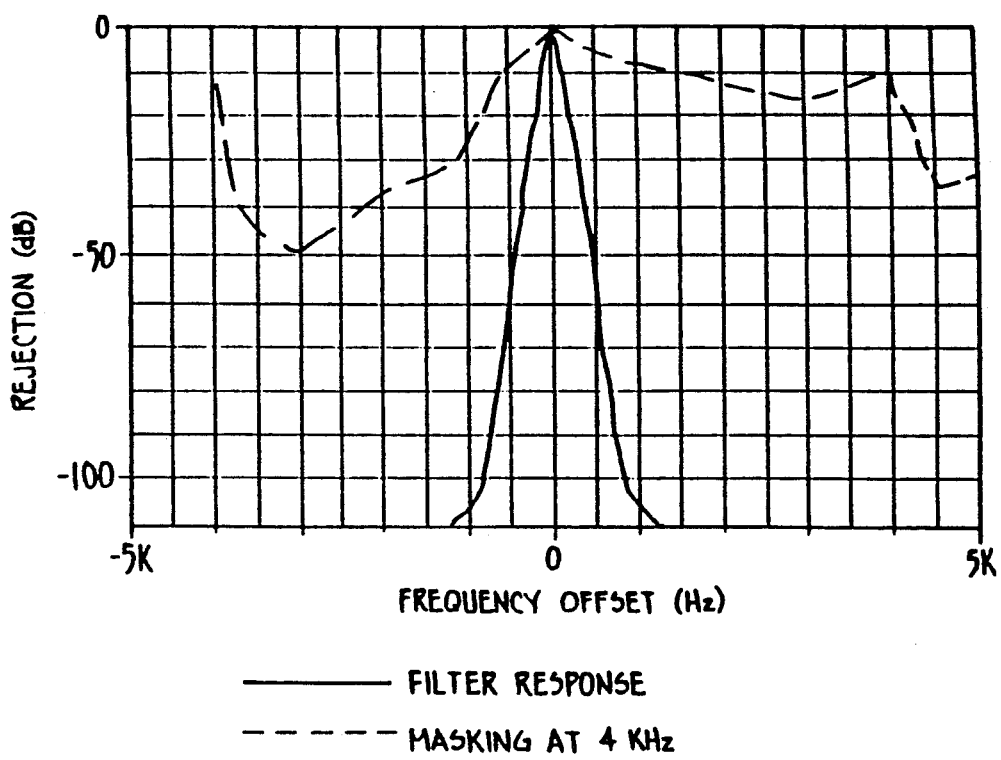
FIG._10.
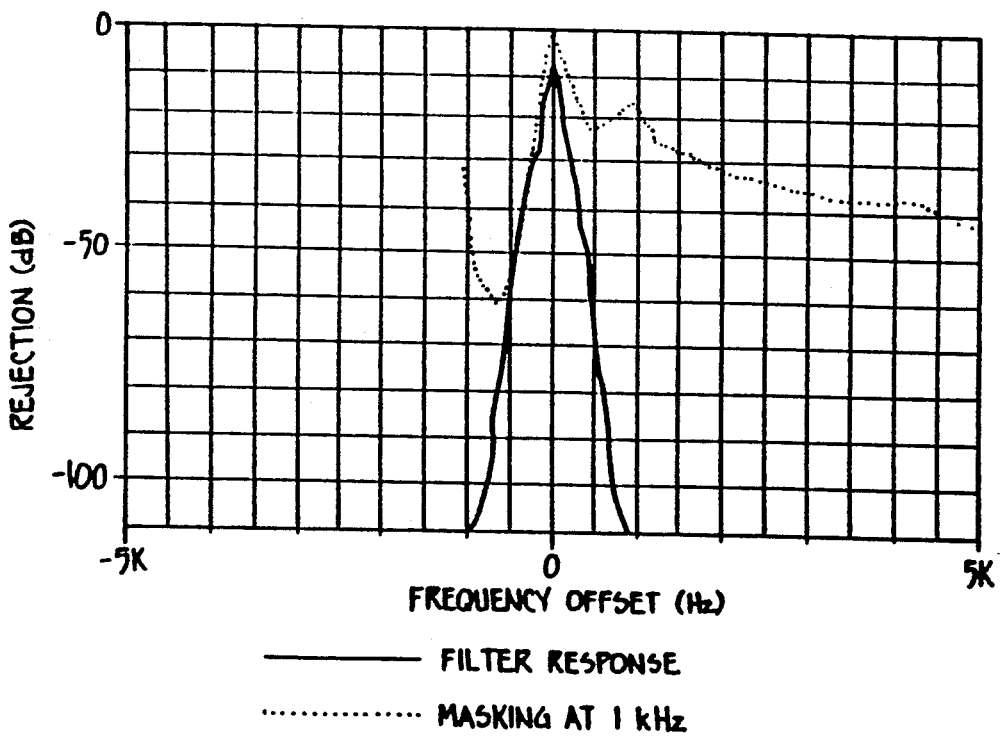
FIG._11.

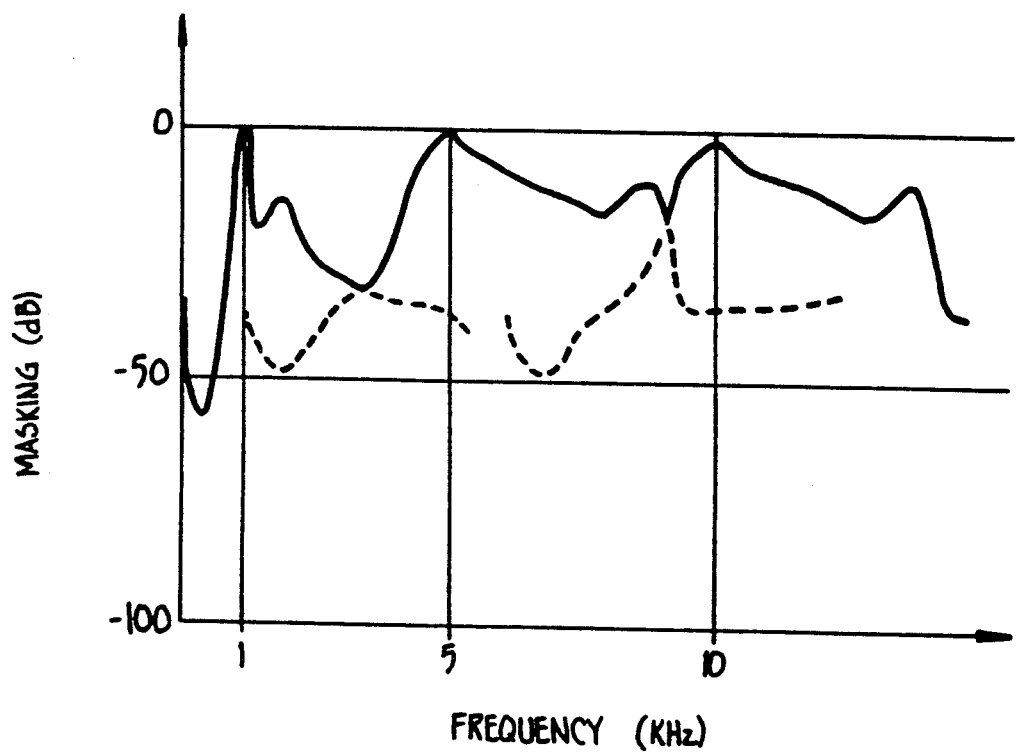
FIG._12.

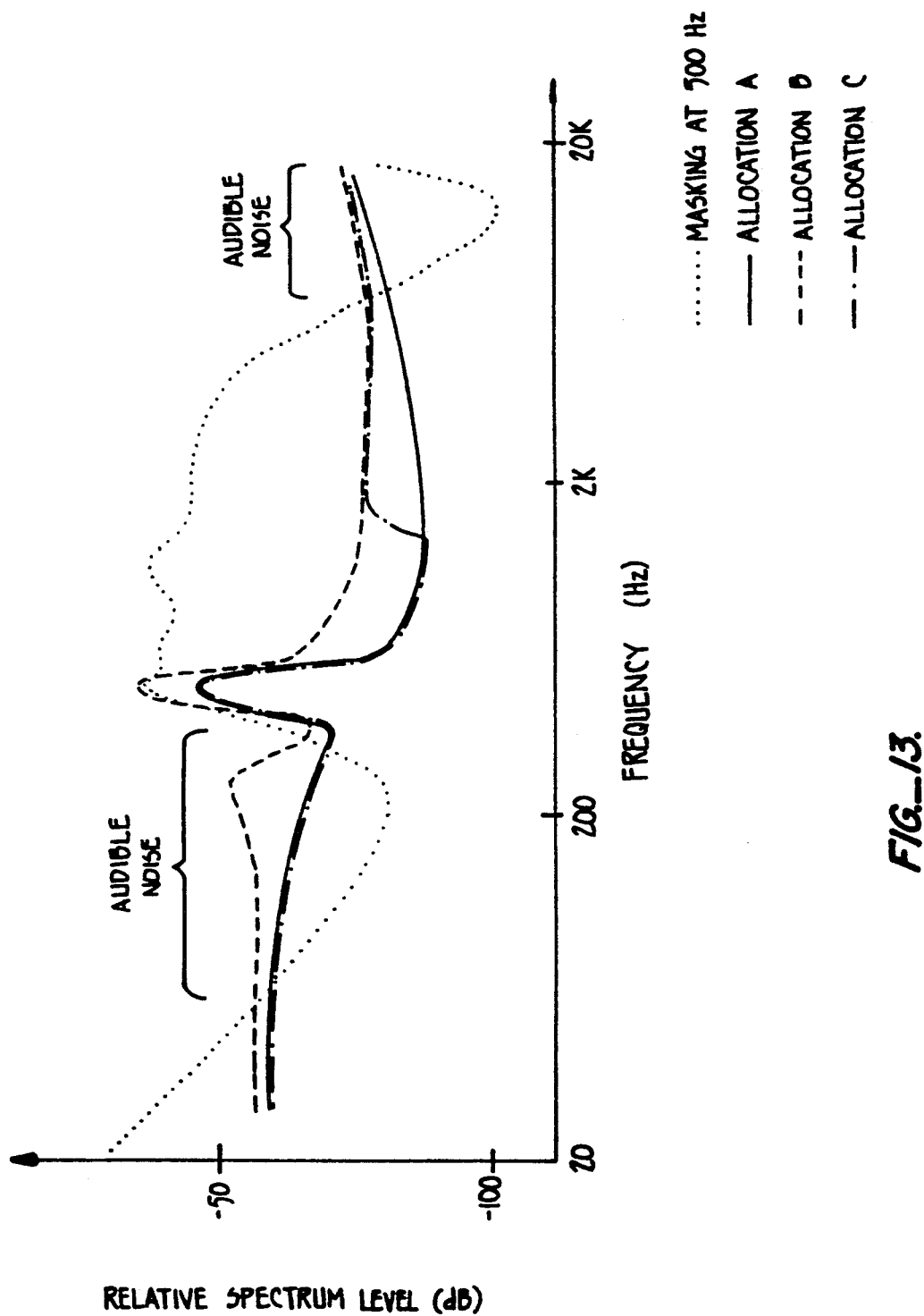
FIG._13.

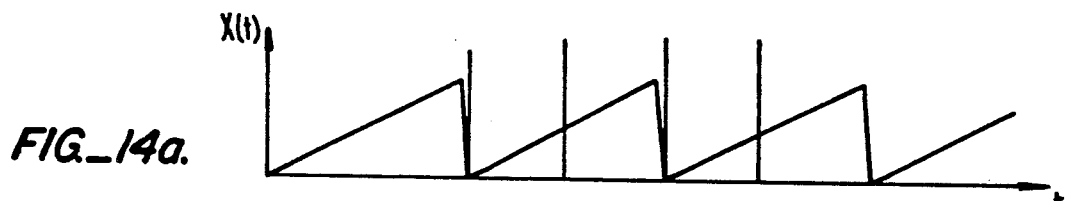
FIG._14a.
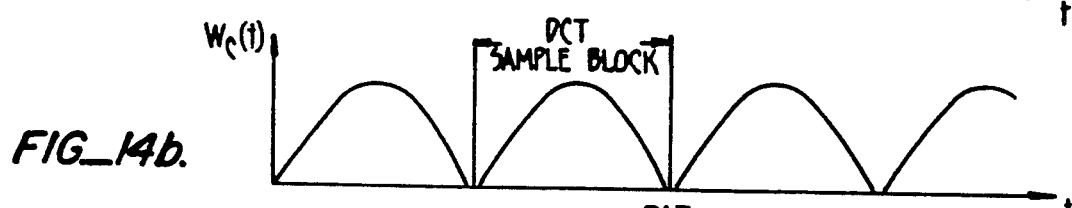
FIG._14b.
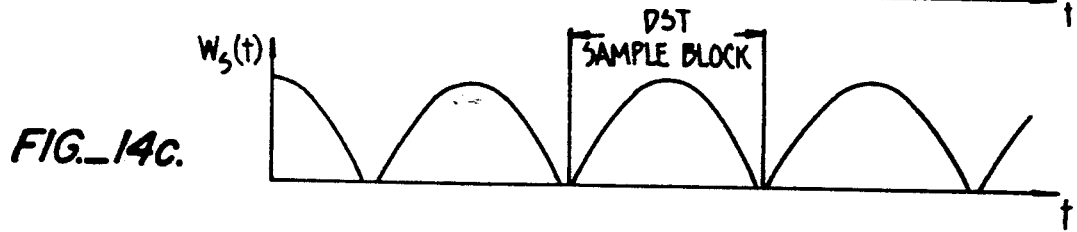
FIG._14c.
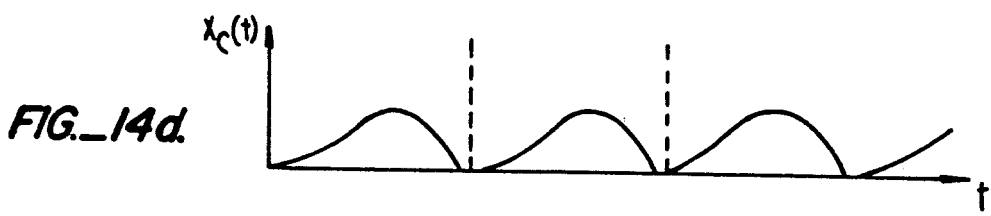
FIG._14d.
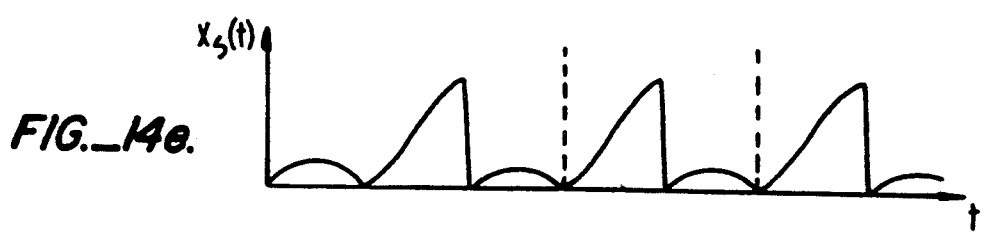
FIG._14e.

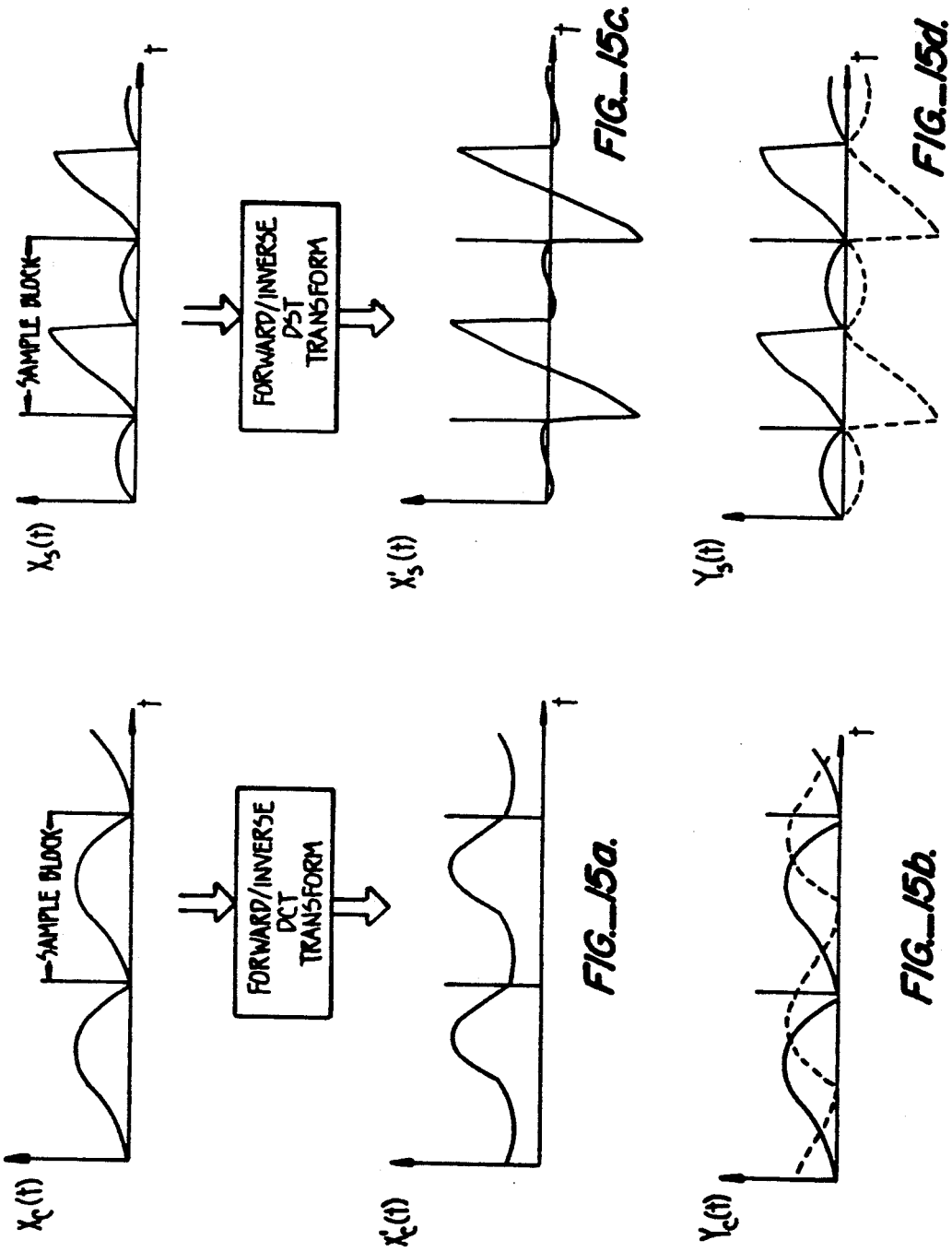

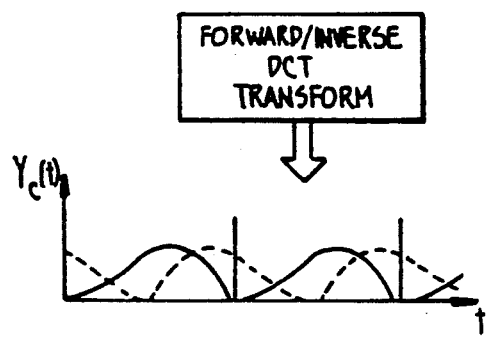
FIG._16a.
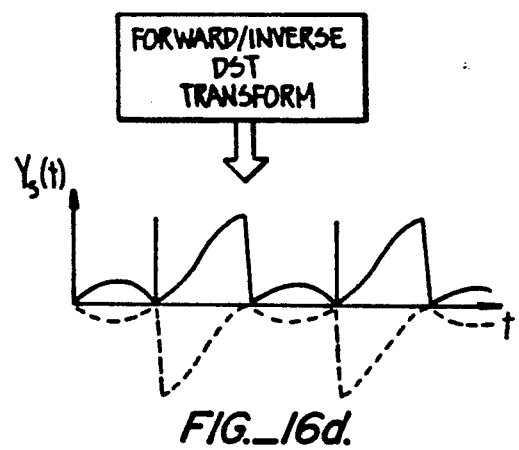
FIG._16d.
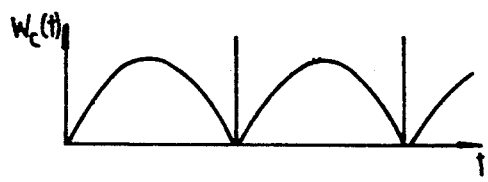
FIG._16b.
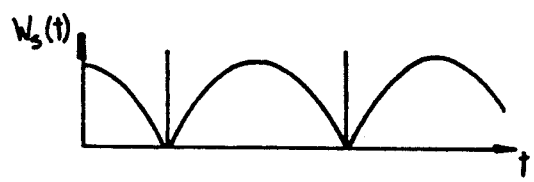
FIG._16e.
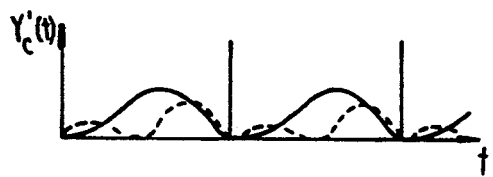
FIG._16c.
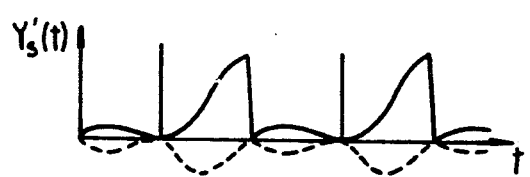
FIG._16f.
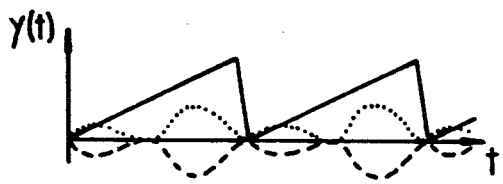
FIG._16g.

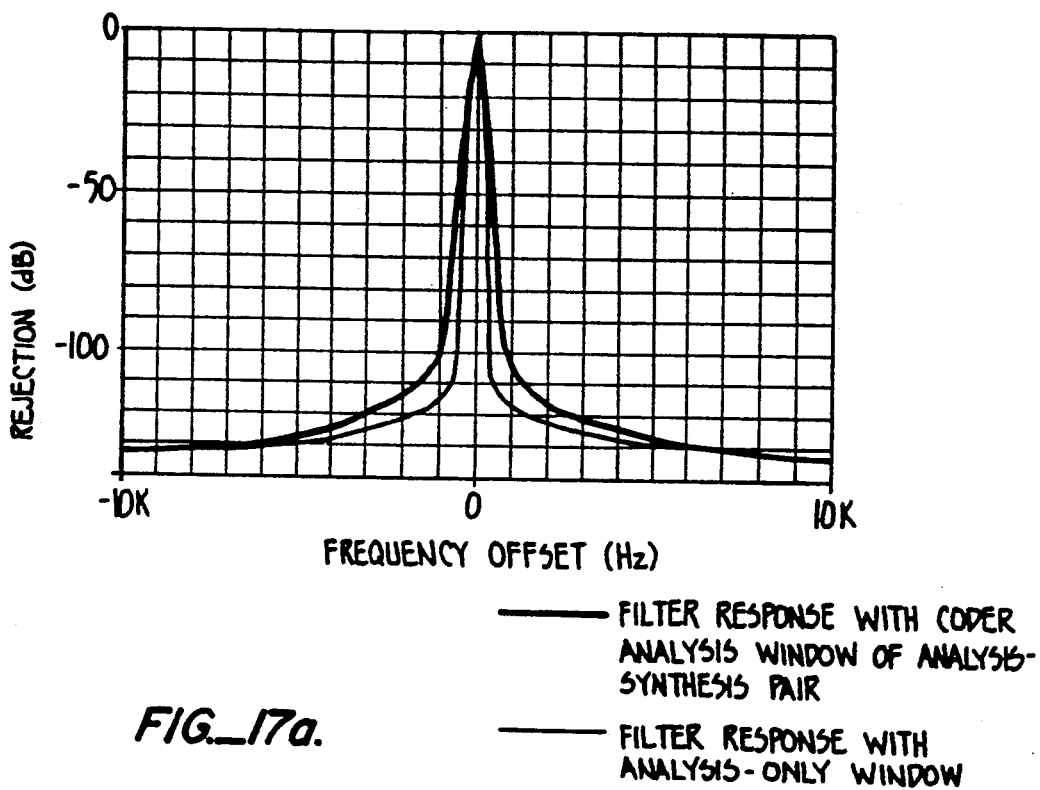
FIG._17a.
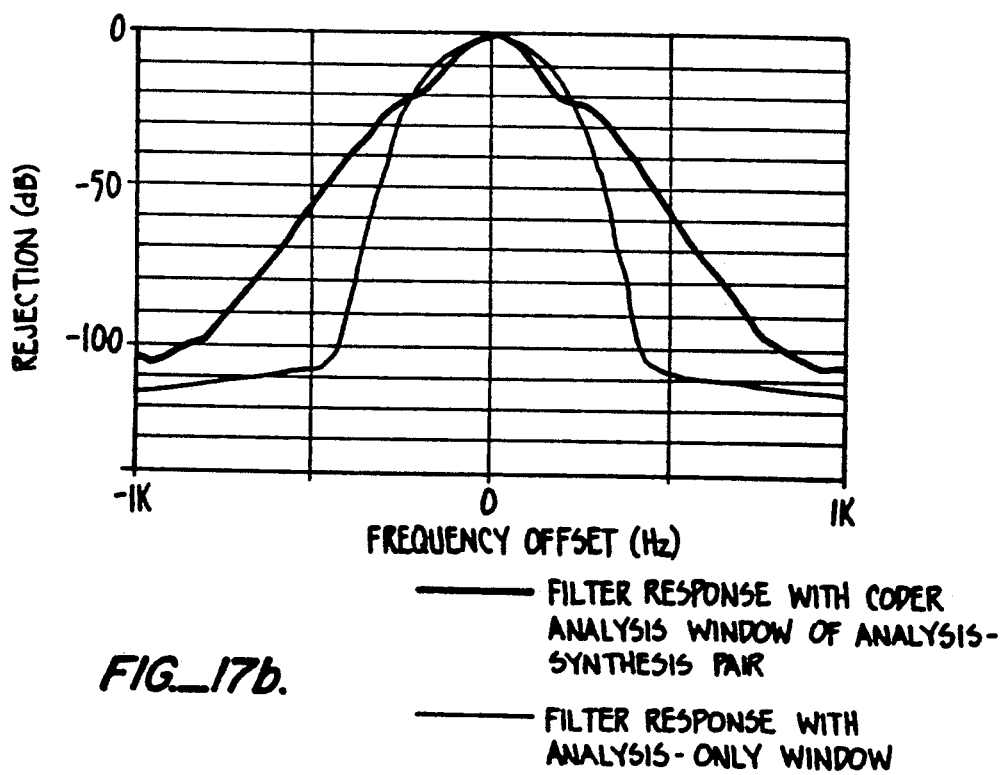
FIG._17b.

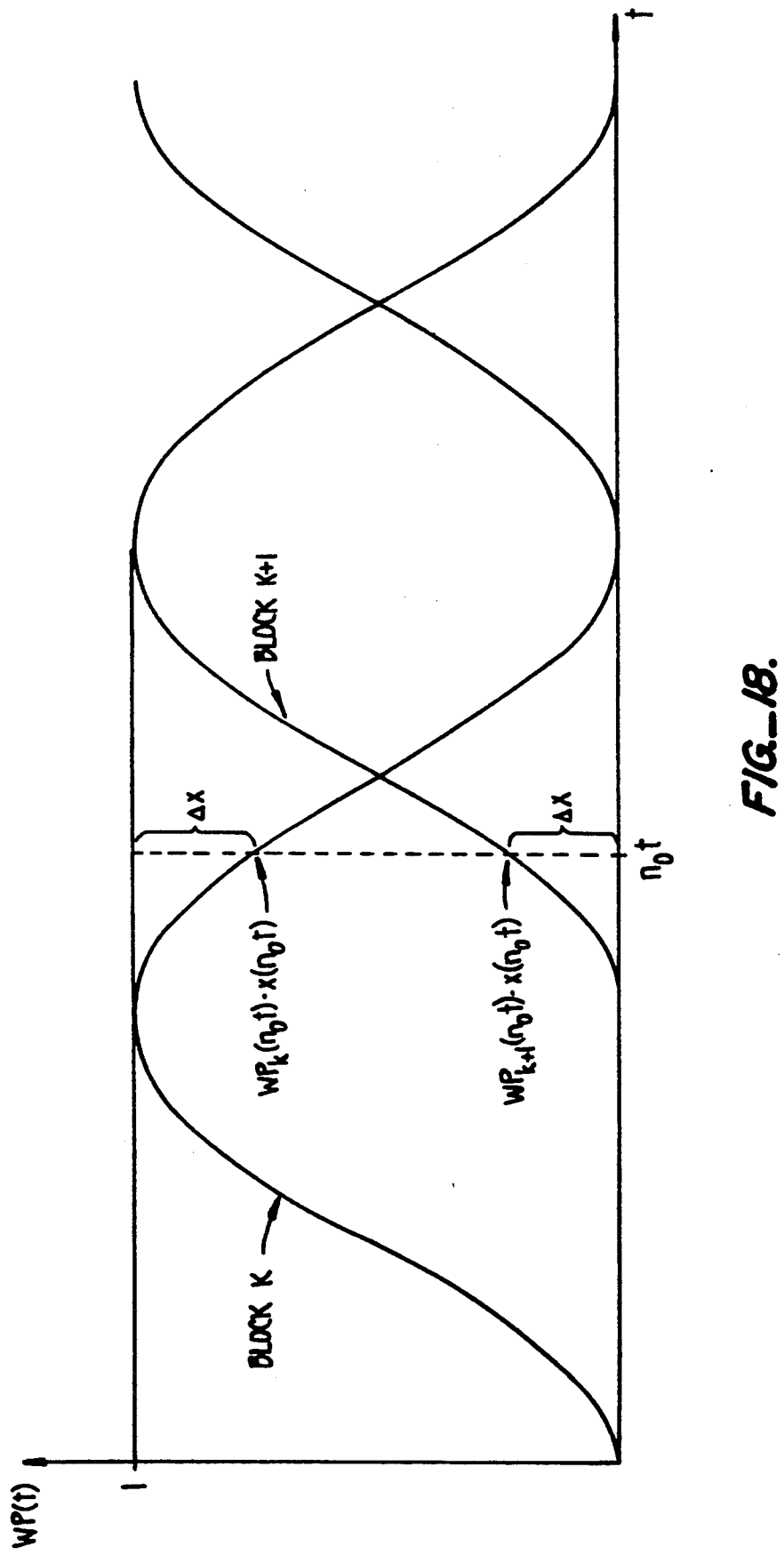
FIG._18.

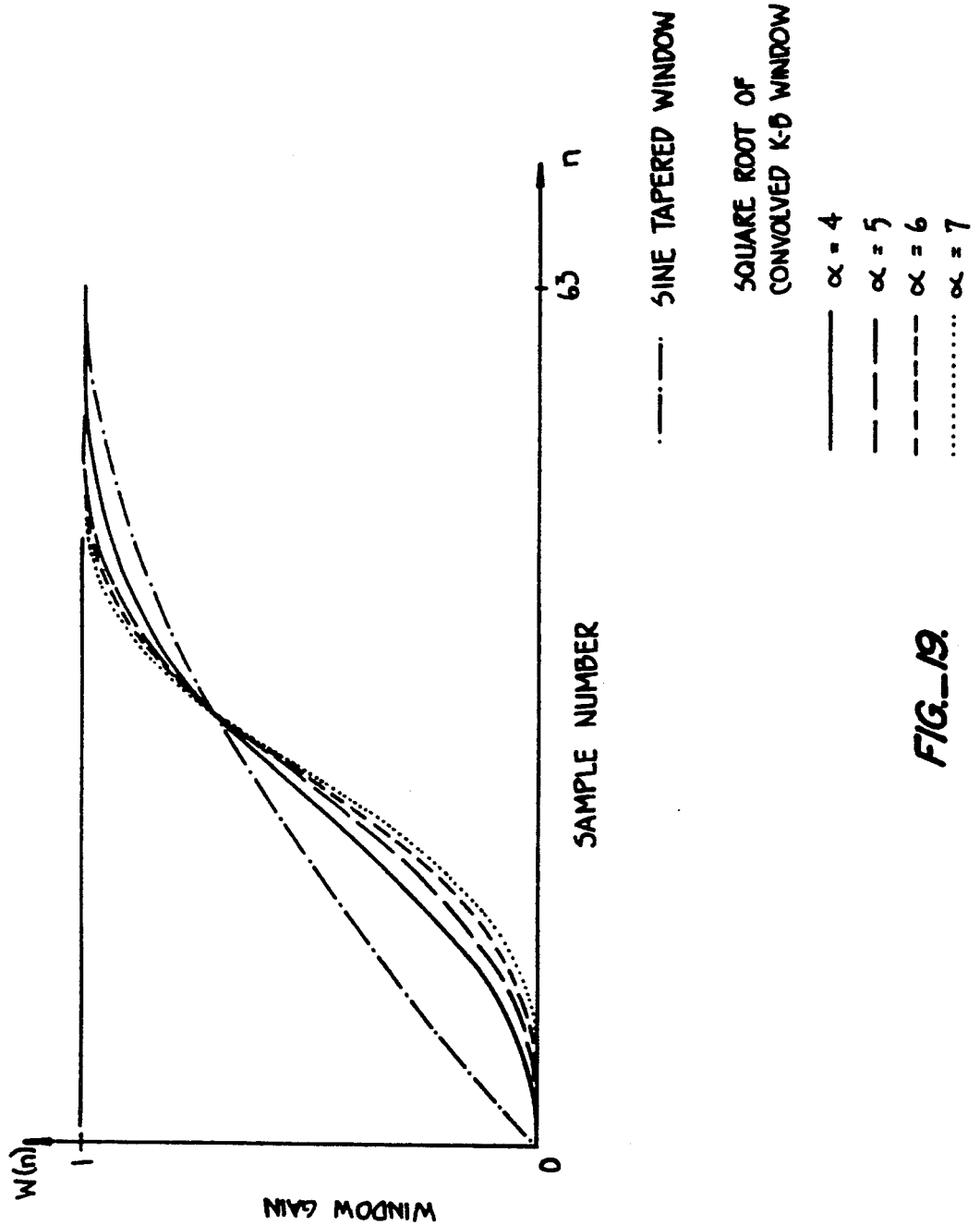
FIG._19.

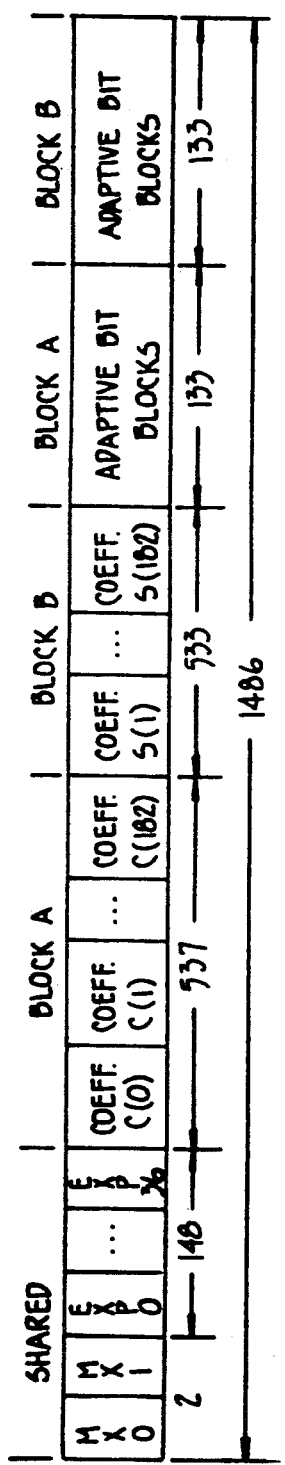
FIG.—20.
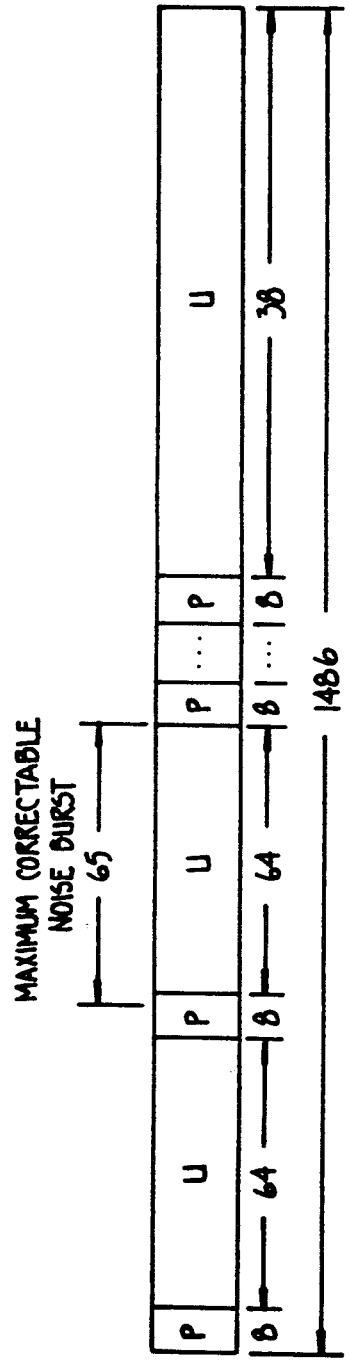
FIG.—21.

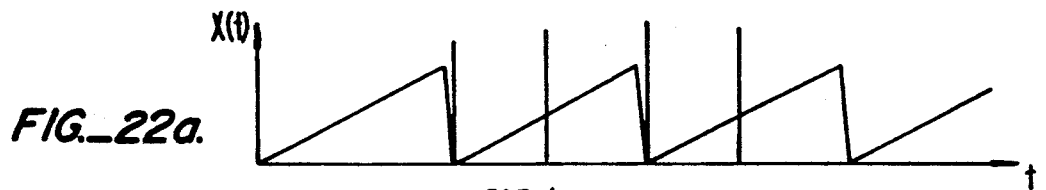
FIG._22a.
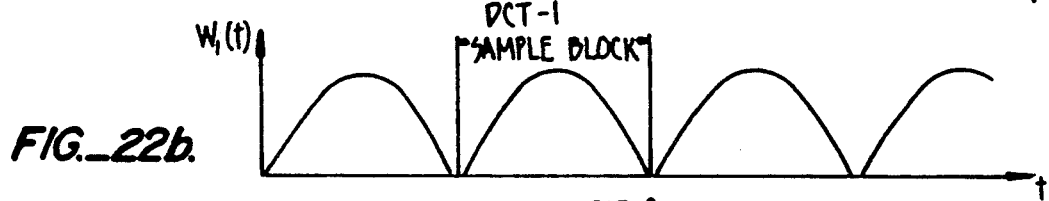
FIG._22b.
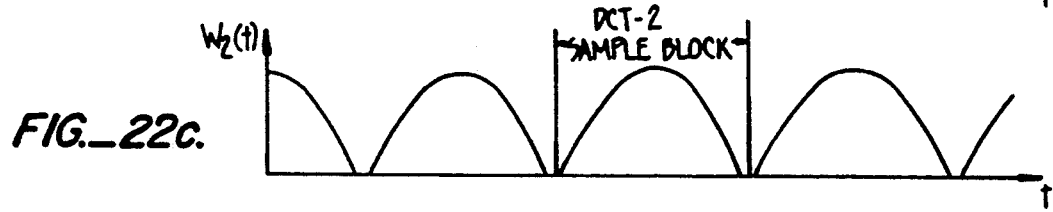
FIG._22c.
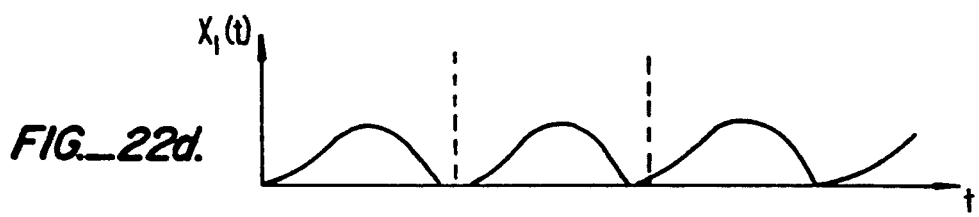
FIG._22d.
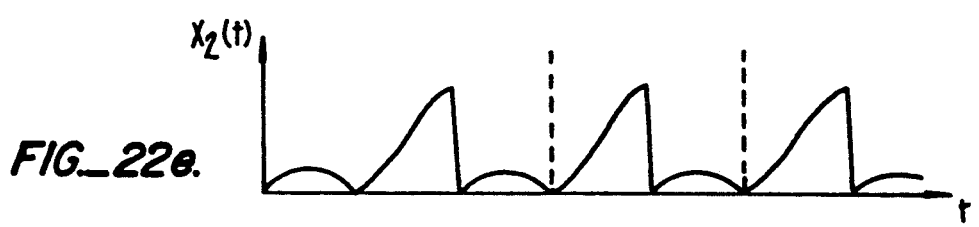
FIG._22e.

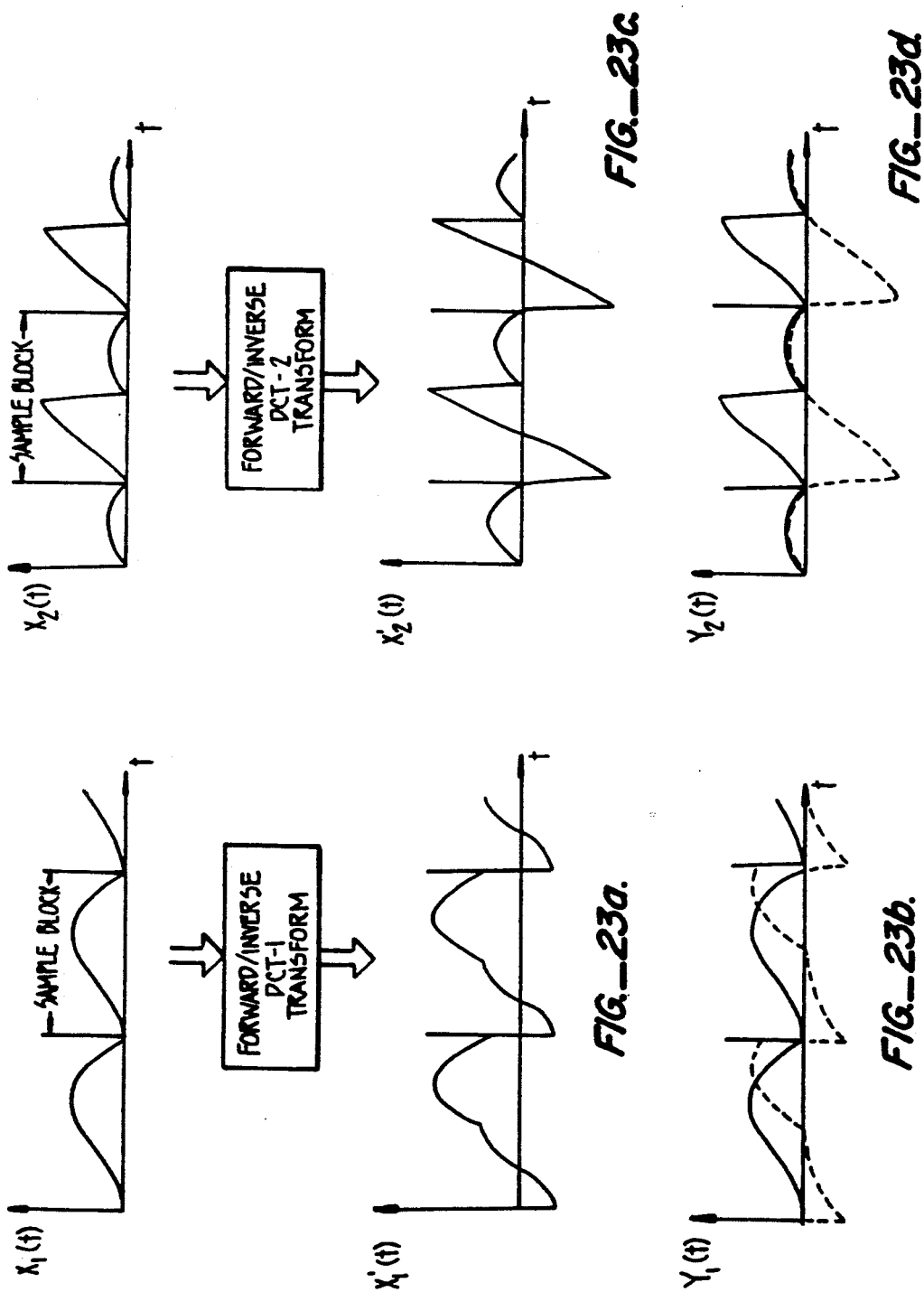

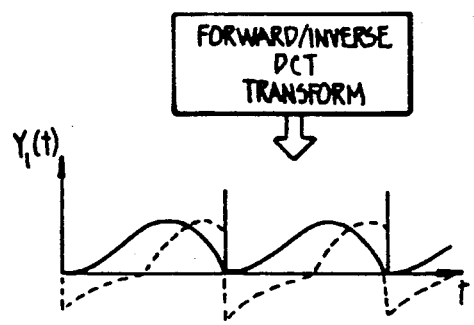
FIG._24a.
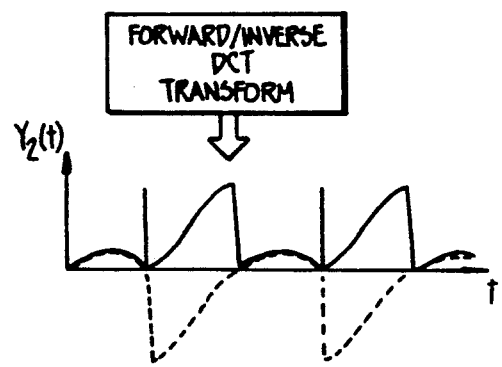
FIG._24d.
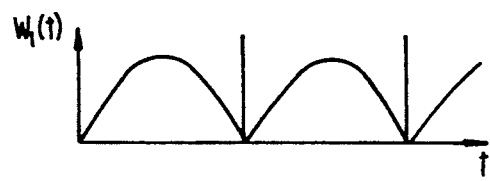
FIG._24b.
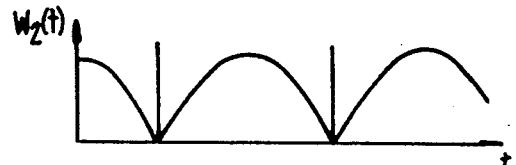
FIG._24e.
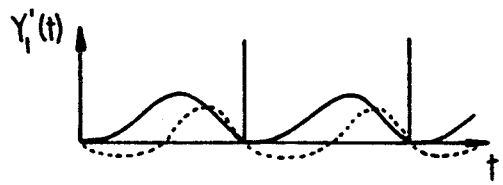
FIG._24c.
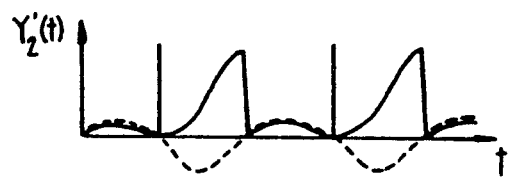
FIG._24f.
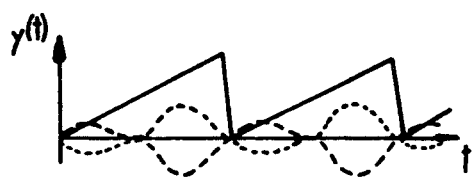
FIG._24g.

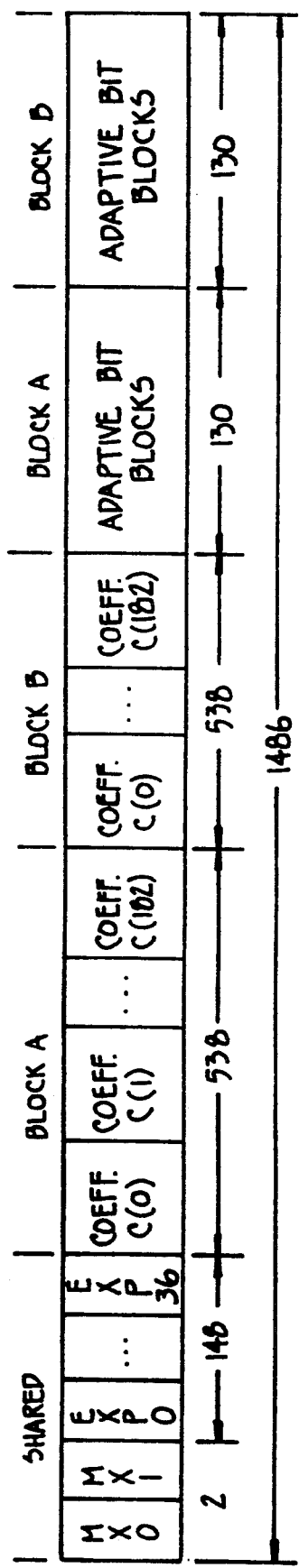
FIG._25.

LOW BIT RATE TRANSFORM CODER, DECODER, AND ENCODER/DECODER FOR HIGH-QUALITY AUDIO

CROSS-REFERENCE TO RELATED APPLICATION

This application is a division of copending application Ser. No. 07/458,894 filed Dec. 29, 1989, now U.S. Pat. No. 5,109,417 issued Apr. 28, 1992 which is a continuation-in-part of application Ser. No. 07/303,714 filed Jan. 27, 1989, abandoned, and of application Ser. No. 07/439,868 filed Nov. 20, 1989, abandoned.

BACKGROUND OF THE INVENTION

The invention relates in general to high-quality low bit-rate digital signal processing of audio signals, such as music signals.

There is considerable interest among those in the field of signal processing to discover methods which minimize the amount of information required to represent adequately a given signal. By reducing required information, signals may be transmitted over communication channels with lower bandwidth, or stored in less space. With respect to digital techniques, minimal informational requirements are synonymous with minimal binary bit requirements.

Two factors limit the reduction of bit requirements:
(1) A signal of bandwidth W may be accurately represented by a series of samples taken at a frequency no less than 2·W. This is the Nyquist sampling rate. Therefore, a signal T seconds in length with a bandwidth W requires at least 2·W·T number of samples for accurate representation.
(2) Quantization of signal samples which may assume any of a continuous range of values introduces inaccuracies in the representation of the signal which are proportional to the quantizing step size or resolution. These inaccuracies are called quantization errors. These errors are inversely proportional to the number of bits available to represent the signal sample quantization.

If coding techniques are applied to the full bandwidth, all quantizing errors, which manifest themselves as noise, are spread uniformly across the bandwidth. Techniques which may be applied to selected portions of the spectrum can limit the spectral spread of quantizing noise. Two such techniques are subband coding and transform coding. By using these techniques, quantizing errors can be reduced in particular frequency bands where quantizing noise is especially objectionable by quantizing that band with a smaller step size.

Subband coding may be implemented by a bank of digital bandpass filters. Transform coding may be implemented by any of several time-domain to frequency-domain transforms which simulate a bank of digital bandpass filters. Although transforms are easier to implement and require less computational power and hardware than digital filters, they have less design flexibility in the sense that each bandpass filter "frequency bin" represented by a transform coefficient has a uniform bandwidth. By contrast, a bank of digital bandpass filters can be designed to have different subband bandwidths. Transform coefficients can, however, be grouped together to define "subbands" having bandwidths which are multiples of a single transform coefficient bandwidth. The term "subband" is used hereinafter to refer to selected portions of the total signal bandwidth, whether implemented by a subband coder or a transform coder. A subband as implemented by transform coder is defined by a set of one or more adjacent transform coefficients or frequency bins. The bandwidth of a transform coder frequency bin depends upon the coder's sampling rate and the number of samples in each signal sample block (the transform length).

Two characteristics of subband bandpass filters are particularly critical to the performance of high-quality music signal processing systems. The first is the bandwidth of the regions between the filter passband and stopbands (the transition bands). The second is the attenuation level in the stopbands. As used herein, the measure of filter "selectivity" is the steepness of the filter response curve within the transition bands (steepness of transition band rolloff), and the level of attenuation in the stopbands (depth of stopband rejection).

These two filter characteristics are critical because the human ear displays frequency-analysis properties resembling those of highly asymmetrical tuned filters having variable center frequencies. The frequency-resolving power of the human ear's tuned filters varies with frequency throughout the audio spectrum. The ear can discern signals closer together in frequency at frequencies below about 500 Hz, but widening as the frequency progresses upward to the limits of audibility. The effective bandwidth of such an auditory filter is referred to as a critical band. An important quality of the critical band is that psychoacoustic-masking effects are most strongly manifested within a critical band—a dominant signal within a critical band can suppress the audibility of other signals anywhere within that critical band. Signals at frequencies outside that critical band are not masked as strongly. See generally, the *Audio Engineering Handbook*, K. Blair Benson ed., McGraw-Hill, San Francisco, 1988, pages 1.40–1.42 and 4.8–4.10.

Psychoacoustic masking is more easily accomplished by subband and transform coders if the subband bandwidth throughout the audible spectrum is about half the critical bandwidth of the human ear in the same portions of the spectrum. This is because the critical bands of the human ear have variable center frequencies that adapt to auditory stimuli, whereas subband and transform coders typically have fixed subband center frequencies. To optimize the opportunity to utilize psychoacoustic-masking effects, any distortion artifacts resulting from the presence of a dominant signal should be limited to the subband containing the dominant signal. If the subband bandwidth is about half or less than half of the critical band (and if the transition band rolloff is sufficiently steep and the stopband rejection is sufficiently deep), the most effective masking of the undesired distortion products is likely to occur even for signals whose frequency is near the edge of the subband passband bandwidth. If the subband bandwidth is more than half a critical band, there is the possibility that the dominant signal will cause the ear's critical band to be offset from the coder's subband so that some of the undesired distortion products outside the ear's critical bandwidth are not masked. These effects are most objectionable at low frequencies where the ear's critical band is narrower.

Transform coding performance depends upon several factors, including the signal sample block length, transform coding errors, and aliasing cancellation.

Block Length

As block lengths become shorter, transform encoder and decoder performance is adversely affected not only by the consequential widening of the frequency bins, but also by degradation of the response characteristics of the bandpass filter frequency bins: (1) decreased rate of transition band rolloff, and (2) reduced level of stopband rejection. This degradation in filter performance results in the undesired creation of or contribution to transform coefficients in nearby frequency bins in response to a desired signal. These undesired contributions are called sidelobe leakage.

Thus, depending on the sampling rate, a short block length may result in a nominal filter bandwidth exceeding the ear's critical bandwidth at some or all frequencies, particularly low frequencies. Even if the nominal subband bandwidth is narrower than the ear's critical bandwidth, degraded filter characteristics manifested as a broad transition band and/or poor stopband rejection may result in significant signal components outside the ear's critical bandwidth. In such cases, greater constraints are ordinarily placed on other aspects of the system, particularly quantization accuracy.

Another disadvantage resulting from short sample block lengths is the exacerbation of transform coding errors, described in the next section.

Transform Coding Errors

Discrete transforms do not produce a perfectly accurate set of frequency coefficients because they work only a finite segment of the signal. Strictly speaking, discrete transforms produce a time-frequency representation of the input time-domain signal rather than a true frequency-domain representation which would require infinite transform lengths. For convenience of discussion here, however, the output of discrete transforms will be referred to as a frequency-domain representation. In effect, the discrete transform assumes the sampled signal only has frequency components whose periods are a submultiple of the finite sample interval. This is equivalent to an assumption that the finite-length signal is periodic. The assumption in general is not true. The assumed periodicity creates discontinuities at the edges of the finite time interval which cause the transform to create phantom high-frequency components.

One technique which minimizes this effect is to reduce the discontinuity prior to the transformation by weighting the signal samples such that samples near the edges of the interval are close to zero. Samples at the center of the interval are generally passed unchanged, i.e., weighted by a factor of one. This weighting function is called an "analysis window" and may be of any shape, but certain windows contribute more favorably to subband filter performance.

As used herein, the term "analysis window" refers merely to the windowing function performed prior to application of the forward transform. As will be discussed below, the design of an analysis window used in the invention is constrained by synthesis window design considerations. Therefore, design and performance properties of an "analysis window" as that term is commonly used in the art may differ from such analysis windows as implemented in this invention.

While there is no single criteria which may be used to assess a window's quality, general criteria include steepness of transition band rolloff and depth of stopband rejection. In some applications, the ability to trade steeper rolloff for deeper rejection level is a useful quality.

The analysis window is a time-domain function. If no other compensation is provided, the recovered or "synthesized" signal will be distorted according to the shape of the analysis window. There are several compensation methods. For example:

(a) The recovered signal interval or block may be multiplied by an inverse window, one whose weighting factors are the reciprocal of those for the analysis window. A disadvantage of this technique is that it clearly requires that the analysis window not go to zero at the edges.

(b) Consecutive input signal blocks may be overlapped. By carefully designing the analysis window such that two adjacent windows add to unity across the overlap, the effects of the window will be exactly compensated. (But see the following paragraph.) When used with certain types of transforms such as the Discrete Fourier Transform (DFT), this technique increases the number of bits required to represent the signal since the portion of the signal in the overlap interval must be transformed and transmitted twice. For these types of transforms, it is desirable to design the window with an overlap interval as small as possible.

(c) The synthesized output from the inverse transform may also need to be windowed. Some transforms, including one used in the current invention, require it. Further, quantizing errors may cause the inverse transform to produce a time-domain signal which does not go to zero at the edges of the finite time interval. Left alone, these errors may distort the recovered time-domain signal most strongly within the window overlap interval. A synthesis window can be used to shape each synthesized signal block at its edges. In this case, the signal will be subjected to an analysis and a synthesis window, i.e., the signal will be weighted by the product of the two windows. Therefore, both windows must be designed such that the product of the two will sum to unity across the overlap. See the discussion in the previous paragraph.

Short transform sample blocks impose greater compensation requirements on the analysis and synthesis windows. As the transform sample blocks become shorter there is more sidelobe leakage through the filter's transition band and stopband. A well shaped analysis window reduces this leakage.

Sidelobe leakage is undesirable because it causes the transform to create spectral coefficients which misrepresent the frequency of signal components outside the filter's passband. This misrepresentation is a distortion called aliasing.

Aliasing Cancellation

The Nyquist theorem holds that a signal may be accurately recovered from discrete samples when the interval between samples is no larger than one-half the period of the signal's highest frequency component. When the sampling rate is below this Nyquist rate, higher-frequency components are misrepresented as lower-frequency components. The lower-frequency component is an "alias" for the true component.

Subband filters and finite digital transforms are not perfect passband filters. The transition between the passband and stopband is not infinitely sharp, and the attenuation of signals in the stopband is not infinitely great. As a result, even if a passband-filtered input signal is sampled at the Nyquist rate suggested by the passband cut-off frequency, frequencies in the transition band above the cutoff frequency will not be faithfully represented.

It is possible to design the analysis and synthesis filters such that aliasing distortion is automatically cancelled by the inverse transform. Quadrature Mirror Filters in the time domain possess this characteristic. Some transform coder techniques, including one used in the present invention, also cancel alias distortion.

Suppressing the audible consequences of aliasing distortion in transform coders becomes more difficult as the sample block length is made shorter. As explained above, shorter sample blocks degrade filter performance: the passband bandwidth increases, the passband-stopband transition becomes less sharp, and the stopband rejection deteriorates. As a result, aliasing becomes more pronounced. If the alias components are coded and decoded with insufficient accuracy, these coding errors prevent the inverse transform from completely cancelling aliasing distortion. The residual aliasing distortion will be audible unless the distortion is psychoacoustically masked. With short sample blocks, however, some transform frequency bins may have a wider passband than the auditory critical bands, particularly at low frequencies where the ear's critical bands have the greatest resolution. Consequently, alias distortion may not be masked. One way to minimize the distortion is to increase quantization accuracy in the problem subbands, but that increases the required bit rate.

Bit-rate Reduction Techniques

The two factors listed above (Nyquist sample rate and quantizing errors) should dictate the bit-rate requirements for a specified quality of signal transmission or storage. Techniques may be employed, however, to reduce the bit rate required for a given signal quality. These techniques exploit a signal's redundancy and irrelevancy. A signal component is redundant if it can be predicted or otherwise provided by the receiver. A signal component is irrelevant if it is not needed to achieve a specified quality of representation. Several techniques used in the art include:

(1) Prediction: a periodic or predictable characteristic of a signal permits a receiver to anticipate some component based upon current or previous signal characteristics.

(2) Entropy coding: components with a high probability of occurrence may be represented by abbreviated codes. Both the transmitter and receiver must have the same code book. Entropy coding and prediction have the disadvantages that they increase computational complexity and processing delay. Also, they inherently provide a variable rate output, thus requiring buffering if used in a constant bit-rate system.

(3) Nonuniform coding: representations by logarithms or nonuniform quantizing steps allow coding of large signal values with fewer bits at the expense of greater quantizing errors.

(4) Floating point: floating-point representation may reduce bit requirements at the expense of lost precision. Block-floating-point representation uses one scale factor or exponent for a block of floating-point mantissas, and is commonly used in coding time-domain signals. Floating point is a special case of nonuniform coding.

(5) Bit allocation: the receiver's demand for accuracy may vary with time, signal content, strength, or frequency. For example, lower frequency components of speech are usually more important for comprehension and speaker recognition, and therefore should be transmitted with greater accuracy than higher frequency components. Different criteria apply with respect to music signals. Some general bit-allocation criteria are:

(a) Component variance: more bits are allocated to transform coefficients with the greatest level of AC power.

(b) Component value: more bits are allocated to transform coefficients which represent frequency bands with the greatest amplitude or energy.

(c) Psychoacoustic masking: fewer bits are allocated to signal components whose quantizing errors are masked (rendered inaudible) by other signal components. This method is unique to those applications where audible signals are intended for human perception. Masking is understood best with respect to single-tone signals rather than multiple-tone signals and complex waveforms such as music signals.

SUMMARY OF THE INVENTION

It is an object of this invention to provide for the digital processing of wideband audio information, particularly music, using an encode/decode apparatus and method which provides high subjective sound quality at an encoded bit rate as low as 128 kilobits per second (kbs).

It is a further object of this invention to provide such an encode/decode apparatus and method suitable for the high-quality transmission or storage and reproduction of music, wherein the quality of reproduction is suitable, for example, for broadcast audio links.

It is a further object of the invention to provide a quality of reproduction subjectively as good as that obtainable from Compact Discs.

It is a further object of the invention to provide such an encode/decode apparatus and method embodied in a digital processing system having a high degree of immunity against signal corruption by transmission paths.

It is yet a further object of the invention to provide such an encode/decode apparatus and method embodied in a digital processing system requiring a small amount of space to store the encoded signal.

Another object of the invention is to provide improved psychoacoustic-masking techniques in a transform coder processing music signals.

It is still another object of the invention to provide techniques for psychoacoustically compensating for otherwise audible distortion artifacts in a transform coder.

Further details of the above objects and still other objects of the invention are set forth throughout this document, particularly in the Detailed Description of the Invention, below.

In accordance with the teachings of the present invention, an encoder provides for the digital encoding of wideband audio information. The wideband audio signals are sampled and quantized into time-domain sample blocks. Each sample block is then modulated by an analysis window. Frequency-domain spectral components are then generated in response to the analysis-window weighted time-domain sample block. A transform coder having adaptive bit allocation nonuniformly quantizes each transform coefficient, and those coefficients are assembled into a digital output having a format suitable for storage or transmission. Error correction codes may be used in applications where the transmitted signal is subject to noise or other corrupting effects of the communication path.

Also in accordance with the teachings of the present invention, a decoder provides for the high-quality reproduction of digitally encoded wideband audio signals encoded by the encoder of the invention. The decoder receives the digital output of the encoder via a storage device or transmission path. It derives the nonuniformly coded spectral components from the formatted digital signal and reconstructs the frequency-domain spectral components therefrom. Time-domain signal sample blocks are generated in response to frequency-domain spectral components by means having characteristics inverse to those of the means in the encoder which generated the frequency-domain spectral components. The sample blocks are modulated by a synthesis window. The synthesis window has characteristics such that the product of the synthesis-window response and the response of the analysis-window in the encoder produces a composite response which sums to unity for two adjacent overlapped sample blocks. Adjacent sample blocks are overlapped and added to cancel the weighting effects of the analysis and synthesis windows and recover a digitized representation of the time-domain signal which is then converted to a high-quality analog output.

Further in accordance with the teachings of the present invention, an encoder/decoder system provides for the digital encoding and high-quality reproduction of wideband audio information. In the encoder portion of the system, the analog wideband audio signals are sampled and quantized into time-domain sample blocks. Each sample block is then modulated by an analysis window. Frequency-domain spectral components are then generated in response to the analysis-window weighted time-domain sample block. Nonuniform spectral coding, including adaptive bit allocation, quantizes each spectral component, and those components are assembled into a digital format suitable for storage or transmission over communication paths susceptible to signal corrupting noise. The decoder portion of the system receives the digital output of the encoder via a storage device or transmission path. It derives the nonuniformly coded spectral components from the formatted digital signal and reconstructs the frequency-domain spectral components therefrom. Time-domain signal sample blocks are generated in response to frequency-domain transform coefficients by means having characteristics inverse to those of the means in the encoder which generated the frequency-domain transform coefficients. The sample blocks are modulated by a synthesis window. The synthesis window has characteristics such that the product of the synthesis-window response and the response of the analysis-window in the encoder produces a composite response which sums to unity for two adjacent overlapped sample blocks. Adjacent sample blocks are overlapped and added to cancel the weighting effects of the analysis and synthesis windows and recover a digitized representation of the time-domain signal which is then converted to a high-quality analog output.

In an embodiment of the encoder of the present invention, a discrete transform generates frequency-domain spectral components in response to the analysis-window weighted time-domain sample blocks. Preferably, the discrete transform has a function equivalent to the alternate application of a modified Discrete Cosine Transform (DCT) and a modified Discrete Sine Transform (DST). In an alternative embodiment, the discrete transform is implemented by a single modified Discrete Cosine Transform (DCT), however, virtually any time-domain to frequency-domain transform can be used.

In a preferred embodiment of the invention, a single FFT is utilized to simultaneously calculate the forward transform for two adjacent signal sample blocks in a single-channel system, or one signal sample block from each channel of a two-channel system. In a preferred embodiment of the invention for the decoder, a single FFT is utilized to simultaneously calculate the inverse transform for two transform blocks.

In the preferred embodiments of the encoder and decoder, the sampling rate is 44.1 kHz. While the sampling rate is not critical, 44.1 kHz is a suitable sampling rate and it is convenient because it is also the sampling rate used for Compact Discs. An alternative embodiment employs a 48 kHz sampling rate. In the preferred embodiment employing the 44.1 kHz sampling rate, the nominal frequency response extends to 15 kHz and the time-domain sample blocks have a length of 512 samples. In the preferred embodiment of the invention, music coding at subjective quality levels suitable for professional broadcasting applications may be achieved using serial bit rates as low as 128 kBits per second (including overhead information such as error correction codes). Other bit rates yielding varying levels of signal quality may be used without departing from the basic spirit of the invention.

In a preferred embodiment of the encoder, the nonuniform transform coder computes a variable bit-length code word for each transform coefficient, which codeword bit length is the sum of a fixed number of bits and a variable number of bits determined by adaptive bit allocation based on whether, because of current signal content, noise in the subband is less subject to psychoacoustic masking than noise in other subbands. The fixed number of bits are assigned to each subband based on empirical observations regarding psychoacoustic-masking effects of a single-tone signal in the subband under consideration. The assignment of fixed bits takes into consideration the poorer subjective performance of the system at low frequencies due to the greater selectivity of the ear at low frequencies. Although masking performance in the presence of complex signals ordinarily is better than in the presence of single tone signals, masking effects in the presence of complex signals are not as well understood nor are they as predictable. The system is not aggressive in the sense that most of the bits are fixed bits and a relatively few bits are adaptively assigned. This approach has several advantages. First, the fixed bit assignment inherently compensates for the undesired distortion products generated by the inverse transform because the empirical procedure which established the required fixed bit assignments included the inverse transform process. Second, the adaptive bit-allocation algorithm can be kept relatively simple. In addition, adaptively-assigned bits are more sensitive to signal transmission errors occuring between the encoder and decoder since such errors can result in incorrect assignment as well as incorrect values for these bits in the decoder.

The empirical technique for allocating bits in accordance with the invention may be better understood by reference to FIG. 13 which shows critical band spectra of the output noise and distortion (e.g., the noise and distortion shown is with respect to auditory critical bands) resulting from a 500 Hz tone (sine wave) for three different bit allocations compared to auditory masking. The Figure is intended to demonstrate an empirical approach rather than any particular data.

Allocation A (the solid line) is a reference, showing the noise and distortion products produced by the 500 Hz sine wave when an arbitrary number of bits are allocated to each of the transform coefficients. Allocation B (the short dashed line) shows the noise and distortion products for the same relative bit allocation as allocation A but with 2 fewer bits per transform coefficient. Allocation C (the long dashed line) is the same as allocation A for frequencies in the lower part of the audio band up to about 1500 Hz. Allocation C is then the same as allocation B for frequencies in the upper part of the audio band above about 1500 Hz. The dotted line shows the auditory masking curve for a 500 Hz tone.

It will be observed that audible noise is present at frequencies below the 500 Hz tone for all three cases of bit allocation due to the rapid fall off of the masking curve: the noise and distortion product curves are above the masking threshold from about 100 Hz to 300 or 400 Hz. The removal of two bits (allocation A to allocation B) exacerbates the audible noise and distortion; adding back the two bits over a portion of the spectrum including the region below the tone, as shown in allocation C, restores the original audible noise and distortion levels. Audible noise is also present at high frequencies, but does not change as substantially when bits are removed and added because at that extreme portion of the audio spectrum the noise and distortion products created by the 500 Hz tone are relatively low.

By observing the noise and distortion created in response to tones at various frequencies for various bit allocations, bit lengths for the various transform coefficients can be allocated that result in acceptable levels of noise and distortion with respect to auditory masking throughout the audio spectrum. With respect to the example in FIG. 13, in order to lower the level of the noise and distortion products below the masking threshold in the region from about 100 Hz to 300 to 400 Hz, additional bits could be added to the reference allocation for the transform coefficient containing the 500 Hz tone and nearby coefficients until the noise and distortion dropped below the masking threshold. Similar steps would be taken for other tones throughout the audio spectrum until the overall transform-coefficient bit-length allocation resulted in acceptably low audible noise in the presence of tones, taken one at a time, throughout the audio spectrum. This is most easily done by way of computer simulations. The fixed bit allocation assignment is then taken as somewhat less by removing one or more bits from each transform coefficient across the spectrum (such as allocation B). Adaptively allocated bits are added to reduce the audible noise to acceptable levels in the problem regions as required (such as allocation C). Thus, empirical observations regarding the increase and decrease of audible noise with respect to bit allocation such as in the example of FIG. 13 form the basis of the fixed and adaptive bit allocation scheme of the present invention.

In a preferred embodiment of the encoder, the nonuniformly quantized transform coefficients are expressed by a block-floating-point representation comprised of block exponents and variable-length code words. As described above, the variable-length code words are further comprised of a fixed bit-length portion and a variable length portion of adaptively assigned bits. The encoded signal for a pair of transform blocks is assembled into frames composed of exponents and the fixed-length portion of the code words followed by a string of all adaptively allocated bits. The exponents and fixed-length portion of code words are assembled separately from adaptively allocated bits to reduce vulnerability to noise burst errors.

Unlike many coders in the prior art, an encoder conforming to this invention need not transmit side information regarding the assignment of adaptively allocated bits in each frame. The decoder can deduce the correct assignment by applying the same allocation algorithm to the exponents as that used by the encoder.

In applications where frame synchronization is required, the encoder portion of the invention appends the formatted data to frame synchronization bits. The formatted data bits are first randomized to reduce the probability of long sequences of bits with values of all ones or zeroes. This is necessary in many environments such as T-1 carrier which will not tolerate such sequences beyond specified lengths. In asynchronous applications, randomization also reduces the probability that valid data within the frame will be mistaken for the block synchronization sequence. In the decoder portion of the invention, the formatted data bits are recovered by removing the frame synchronization bits and applying an inverse randomization process.

In applications where the encoded signal is subject to corruption, error correction codes are utilized to protect the most critical information, that is, the exponents and possibly the fixed portions of the lowest-frequency coefficient code words. Error codes and the protected data are scattered throughout the formatted frame to reduce sensitivity to noise burst errors, i.e., to increase the length of a noise burst required before critical data cannot be corrected.

The various features of the invention and its preferred embodiments are set forth in greater detail in the following Detailed Description of the Invention and in the accompanying drawings.

BRIEF DESCRIPTION OF DRAWINGS

FIGS. 1a and 1b are functional block diagrams illustrating the basic structure of the invention.

FIGS. 2a through 2e are block diagrams showing the hardware architecture for one embodiment of the invention.

FIGS. 3a and 3b are block diagrams showing in greater detail the serial-communications interface of the processor for a two-channel embodiment of the invention.

FIG. 4 is a hypothetical graphical representation showing a time-domain signal sample block.

FIG. 5 is a further hypothetical graphical representation of a time-domain signal sample block showing discontinuites at the edges of the sample block caused by a discrete transform assuming the signal within the block is periodic.

FIG. 6a is a functional block diagram showing the modulation of a function X(t) by a function W(t) to provide the resulting function Y(t).

FIGS. 6b through 6d are further hypothetical graphical representations showing the modulation of a time-domain signal sample block by an analysis window.

FIG. 7 is a flow chart showing the high level logic for the nonuniform quantizer utilized in the invention.

FIG. 8 is a flow chart showing more detailed logic for the adaptive bit allocation process utilized in the invention.

FIG. 9 is a graphical representation showing a representative filter characteristic response curve and two psychoacoustic masking curves.

FIG. 10 is a graphical representation showing a filter characteristic response with respect to a 4 kHz psychoacoustic masking curve.

FIG. 11 is a graphical representation showing a filter characteristic response with respect to a 1 kHz psychoacoustic masking curve.

FIG. 12 is a graphical representation illustrating a composite masking curve derived from the psychoacoustic masking curves of several tones.

FIG. 13 is a graphical representation showing the spectral levels of coding noise and distortion of an encoded 500 Hz tone for three different bit allocation schemes with respect to the psychoacoustic masking curve for a 500 Hz tone.

FIGS. 14a through 14e are hypothetical graphical representations illustrating a time-domain signal grouped into a series of overlapped and windowed time-domain signal sample blocks.

FIGS. 15a through 15d are hypothetical graphical representations illustrating the time-domain aliasing distortion created by the E-TDAC transform.

FIGS. 16a through 16g are hypothetical graphical representations illustrating the cancellation of time-domain aliasing by overlap-add during E-TDAC transform signal synthesis.

FIGS. 17a-17b are a graphical representation comparing filter transition band rolloff and stopband rejection of a filter bank using an analysis-only window with that of a filter bank using the analysis window of an analysis-synthesis window pair designed for the invention.

FIG. 18 is a hypothetical graphical representation showing the overlap-add property of adjacent windowed blocks.

FIG. 19 is a hypothetical graphical representation comparing the shape of several convolved Kaiser-Bessel analysis windows for a range of alpha values 4 to 7 with a sine-tapered window.

FIG. 20 is a schematic representation illustrating the format of a frame of two encoded transform blocks without error correction.

FIG. 21 is a schematic representation illustrating the format of a frame of two encoded transform blocks with error correction codes.

FIGS. 22a through 22e are hypothetical graphical representations illustrating a time-domain signal grouped into a series of overlapped and windowed time-domain signal sample blocks, particularly as implemented for the O-TDAC transform.

FIGS. 23a through 23d are hypothetical graphical representations illustrating the time-domain aliasing distortion created by the O-TDAC transform.

FIGS. 24a through 24g are hypothetical graphical representations illustrating the cancellation of time-domain aliasing by overlap-add during O-TDAC transform signal synthesis.

FIG. 25 is a schematic representation illustrating the format of a frame of two encoded transform blocks, without error correction, for the O-TDAC transform embodiment of the invention.

Table I shows master exponents, subband grouping, and coefficient bit lengths for the 15 kHz E-TDAC embodiment of the invention.

Table II shows subband grouping and coefficient bit lengths for the additional transform coefficients required in a 20 kHz E-TDAC embodiment of the invention.

Table III shows the difference in subband zero required for the O-TDAC embodiment of the invention.

DETAILED DESCRIPTION OF THE INVENTION

I. Preferred Implementation of Invention

FIGS. 1a and 1b show the basic structure of the invention. The coder portion of the invention shown in FIG. 1a comprises time-domain signal input 100, signal sampler and quantizer 101, signal sample buffer 102, analysis-window multiplier 103 which modulates each digitized time-domain signal block, digital filter bank 104 which transforms the quantized signal into frequency coefficients, block-floating-point encoder 105 which converts each integer-valued transform coefficient into a floating-point representation, adaptive bit allocator 106 which assigns bits to the representation of each transform coefficient according to the total signal's spectral composition, uniform quantizer 107 which rounds each transform coefficient to an assigned bit length, and formatter 109 which assembles the coded frequency coefficients into a bit stream for transmission or storage. FIG. 1a depicts a transmission path 110, however, it should be understood that the encoded signal may be stored immediately for later use.

The decoder portion of the invention shown in FIG. 1b comprises encoded bit-stream signal input 111, deformatter 112 which extracts each encoded frequency coefficient from the assembled bit stream, linearizer 113 which converts each encoded coefficient into an integer-valued transform coefficient, inverse digital filter bank 114 which transforms the transform coefficients into a time-domain signal block, synthesis-window multiplier 115 which modulates the time-domain signal block, signal block overlap-adder 116 which recovers a digitized representation of the time-domain signal, analog signal generator 117, and analog signal output 118.

A. Processing Hardware

The basic hardware architecture of the invention is illustrated in FIGS. 2a-2e and 3a-3b. Empirical studies have shown that conventional integer transform computations must be performed to an accuracy of at least 20 significant bits to achieve stated performance objectives.

A practical implementation of a preferred embodiment of a single-channel version of the invention, employing either a 44.1 kHz or a 48 kHz sample rate, utilizes a 16-bit analog-to-digital converter (ADC) with a cycle time of no more than 20 microseconds to quantize the input time-domain signal. Each 16-bit digitized sample is used to form the 16 most-significant bits of a 24-bit word which is used in subsequent computations. A Motorola DSP56001 24-bit digital-signal processor (DSP) operating at 20.5 MHz with no wait states is used to perform the required computations and to control the encode and decode processes. Static random access memory (RAM) provides program and data memory for the DSP. A 16-bit digital-to-analog converter (DAC) with a cycle time of no more than 20 microseconds is used to generate an analog signal from the decoded digital signal.

The encoder hardware architecture, shown in FIG. 2a, is comprised of analog signal input 200, low-pass filter (LPF) 200A, ADC 201, DSP 202, static RAM 203, erasable programmable read-only memory (EPROM) 204, and encoded serial-signal output 206. LPF 200A (a low-pass filter which is not shown in FIG. 1a) insures the input signal is bandwidth limited. ADC 201 digitizes (samples and quantizes) the incoming signal into a serial stream of 16-bit words. DSP 202 receives and buffers the serial stream of digitized samples, groups the samples into blocks, performs the calculations required to transform the blocks into the frequency domain, encodes the transform coefficients, formats the code words into a data stream, and transmits the encoded signal through serial data path 206. The programming and data work areas for the DSP are stored in two 24 kilobyte (KB) banks of static RAM 203 which is organized into two sets of 8,192 24-bit words. The DSP requires fast-access-time program memory which can be implemented more cheaply in RAM than it can be in programmable ROM. Consequently, EPROM 204 stores programming and static data in a compressed format which the DSP unpacks into a usable form into RAM 203 when the encoder is first powered on.

FIGS. 2b and 2c provide more detail on two DSP interfaces. FIG. 2b shows the serial-communication interface for DSP 202, ADC 201, and serial data path 206. Timing generator 202A generates the receive clock, frame-synchronization, and transmit clock signals for the encoder. Line SC0 clocks a serial-bit stream of digitized input signal samples along line SRD from ADC 201 DSP 202. Line SC1 provides the frame-synchronization signal to the ADC and the DSP which marks the beginning of each 16-bit word. Line SCK clocks a serial-bit stream of the encoded signal along line STD from the DSP to serial data path 206.

FIG. 2c shows the memory addressing interface. Memory for the Motorola DSP56001 is divided into three segments: program, X data, and Y data. One bank of RAM, which contains program memory, is selected whenever the DSP brings line PS low. A second bank contains data memory, which is selected whenever line DS is brought low. The DSP selects between X data and Y data memory by raising line XY high or bringing line XY low, respectively. X data and Y data memory are mapped into separate addresses spaces by attaching line XY to address line A12. Therefore, 4K words (4096 or $1000_{16}$ 24-bit words) of Y data memory are mapped into word addresses $0000-0FFF_{16}$, 4K words of X data memory are mapped into word addresses $1000_{16}-1FFF_{16}$, and program memory resides in its own space of 8K words, comprising word addresses $0000_{16}-1FFF_{16}$.

Program/data RAM 203 and EPROM 204 are mapped into separate address spaces. Inverter 205C allows DSP 202 to select either RAM or EPROM according the state of address line A15. When DSP 202 sets A15 high, inverter 205C sets the chip-select (CS) lines of RAM 203 and EPROM 204 low. Only EPROM 204 is selected when CS is low. When DSP 202 sets A15 low, inverter 205C sets the CS lines of RAM 203 and EPROM 204 high. Only static RAM 203 is selected when CS is high.

The decoder hardware architecture, shown in FIG. 2d, is comprised of encoded serial-signal input path 207, DSP 208, static RAM 209, EPROM 210, DAC 212, LPF 213A, and analog signal output 213. DSP 208 receives and buffers the encoded signal, deformats the signal into the encoded transform coefficients, performs the calculations required to transform the coefficients into the time domain, groups the coefficients into time-domain blocks, overlap-adds the blocks into a time-domain sequence of digital samples, and transmits the digital samples in a serial-bit stream to DAC 212. The programming and data work areas for the DSP are stored in two 24 KB banks of static RAM 209 which is organized into two sets of 8,192 24-bit words. EPROM 210 stores in a compressed format programming and static data which the DSP unpacks into usable form into RAM 209 when the decoder is first powered on. DAC 212 generates an analog signal corresponding to the serial-data stream received from the DSP. LPF 213A (a low-pass filter which is not shown in FIG. 1b) insures signal output 213 is free of any spurious high-frequency components created by the encode/decode process.

FIG. 2e shows the serial-communication interface for DSP 208, serial-signal input path 207, and DAC 212. Timing generator 208A, using a phase-locked loop circuit to extract a timing reference from the encoded serial-bit input signal, generates the receive clock, frame-synchronization, and transmit clock signals for the decoder. Line SC0 clocks the encoded serial-bit signal along line SRD into DSP 208. Line SCK clocks a serial-bit stream of the decoded digitized signal samples along line STD from DSP 208 to DAC 212. Line SC2 provides a frame-synchronization signal to the DAC and to the DSP which marks the beginning of each 16-bit word. The interface between DSP 208 and the memory-address bus is implemented in the same manner as that described above for the encoder. See FIG. 2c.

The two-channel encoder requires LPF 200A and 200B, and ADC 201A and 201B, connected as shown in FIG. 3a. The interface between the DSP and ADC components operates in a manner similar to that described above for a one-channel encoder. Timing generator 202A provides an additional signal to line SC2 of the DSP at one-half the rate of the frame-synchronization signal to control multiplexer 202B and indicate to the DSP which of the two ADC is currently sending digitized data.

The two-channel decoder requires DAC 212A and 212B, and LPF 213A and 213B, connected as shown in FIG. 3b. The interface between the DSP DAC and components operates in a manner similar to that described above for a one-channel decoder. Timing generator 208A provides an additional signal to line SC1 of the DSP at one-half the rate of the frame-synchronization signal to control demultiplexer 208B and indicate to the DSP which of the two DAC is currently receiving digital data.

The basic hardware architecture may be modified. For example, one Motorola DSP56001 operating at 27 MHz with no wait states can implement a two-channel encoder or decoder. Additional RAM may be required.

Further, specialized hardware may be used to perform certain functions such as window modulation or the Fast Fourier Transform (FFT). The entire encoder/decoder may be implemented in a customdesigned integrated circuit. Many other possible implementations will be obvious to one skilled in the art.

B. Input Signal Sampling and Windowing

In the current embodiment of the invention, signal sampler and quantizer 101 is an analog-to-digital converter which quantizes the input signal into 16 bits which are subsequently padded on the right with 8 zero bits to form a 24-bit integer representation. All subsequent transform calculations are performed in 24-bit integer arithmetic. The analog input signal should be limited in bandwidth to at most 15 kHz (20 kHz for a 20 kHz bandwidth coder). This may be accomplished by a low-pass filter not shown in FIG. 1a.

A music signal with at least Compact Disc (CD) quality has, in addition to other qualities, a bandwidth in excess of 15 kHz. From the Nyquist theorem, it is known that a 15 kHz bandwidth signal must be sampled at no less than 30 kHz. A sample rate of 44.1 kHz is chosen for one embodiment of the invention because this rate is used in CD applications and such a choice simplifies the means necessary to use this invention in such applications. (This sample rate also supports an alternative 20 kHz bandwidth embodiment of the invention.)

Other sampling rates, such as 48 kHz which is a rate common to many professional audio applications, may be utilized. If an alternate rate is chosen, the frequency separation between adjacent transform coefficients will be altered and the number of coefficients required to represent the desired signal bandwidth will change. The full effect that a change in sampling rate will have upon the implementation of the invention will be apparent to one skilled in the art.

Assuming the input signal is not a complex one, i.e., all imaginary components are zero, a frequency-domain transform of a 512 sample block produces at most 256 unique nonzero transform coefficients. Hence, the invention shown in FIGS. 1a and 1b is comprised of 256 frequency bins. In this implementation, the bandwidth of each bin is equal to 86.1 Hz (or 44.1 kHz/512). (For some discrete transforms bin 0, the DC or zero frequency component, has a bandwidth equal to half of this amount.) Only coefficients 0–182 are used to pass a 15.6 kHz signal. (Coefficients 0–233 are used in a 20 kHz version to pass a 20.1 kHz signal.) The additional high-frequency coefficients above the input signal bandwidth are used to minimize the adverse effects of quantizing errors upon aliasing cancellation within the design bandwidth. Note that it is assumed the input signal is band-limited to 15 kHz (or 20 kHz) and the final output signal is also band-limited to reject any aliasing passed in the highest coefficients.

Unless the sample block is modified, a discrete transform will erroneously create nonexistent spectral components because the transform assumes the signal in the block is periodic. See FIG. 4. These transform errors are caused by discontinuities at the edges of the block as shown in FIG. 5. These discontinuities may be smoothed to minimize this effect. FIGS. 6a through 6d illustrate how a block is modified or weighted such that the samples near the block edges are close to zero. The multiplier circuit shown in FIG. 6a modulates the sampled input signal x(t) shown in FIG. 6b by the weighting function shown in FIG. 6c. The resultant signal is shown in FIG. 6d. This process is represented by box 103 in FIG. 1a. This weighting function, called an analysis window, is a sample-by-sample multiplication of the signal sample block, and has been the subject of considerable study because its shape has profound affects upon digital filter performance. See, for example, Harris, "On the Use of Windows for Harmonic Analysis with the Discrete Fourier Transform," *Proc. IEEE*, vol. 66, 1978, pp. 51–83. Briefly, a good window increases the steepness of transition band rolloff and depth of stopband rejection, and permits correction of its modulation effects by overlapping and adding adjacent blocks. Window design is discussed below in more detail.

C. Analysis Filter Bank-Forward Transform

A discrete transform implements digital filter bank 104 shown in FIG. 1a. Filtering is performed by converting the time-domain signal samples blocks into a set of time varying spectral coefficients. Any one of several transform techniques may be used to implement the filter bank. The transform technique used in one embodiment of the invention was first described in Princen and Bradley, "Analysis/Synthesis Filter Bank Design Based on Time Domain Aliasing Cancellation, "*IEEE Trans. on Acoust., Speech, Signal Proc.*, vol. ASSP-34, 1986, pp. 1153–1161. This techique is the time-domain equivalent of an evenly-stacked critically sampled single-sideband analysis-synthesis system. This transform is referred to herein as Evenly-Stacked Time-Domain Aliasing Cancellation (E-TDAC). An alternative form of the TDAC transform may be used in another embodiment of the invention. The technique is described in Princen, Johnson, and Bradley, "Subband/Transform Coding Using Filter Bank Designs Based on Time Domain Aliasing Cancellation," *ICASSP 1987 Conf. Proc.*, May 1987, pp. 2161–64. This alternate transform is the time-domain equivalent of an oddly-stacked critically sampled single-sideband analysis-synthesis system. It is referred to herein as Oddly-Stacked Time-Domain Aliasing Cancellation (O-TDAC). An embodiment of the invention using the O-TDAC transform is discussed after the E-TDAC embodiment has been fully described.

E-TDAC utilizes a transform function which is equivalent to the alternate application of a modified Discrete Cosine Transform (DCT) with a modified Discrete Sine Transform (DST). The DCT, shown in equation 1, and the DST, shown in equation 2, are $$C(k) = \sum_{n=0}^{N-1} x(n)\cos\left(2\pi k \frac{n+m}{N}\right) \text{ for } 0 \leq k < N \quad (1)$$

$$S(k) = \sum_{n=0}^{N-1} x(n)\sin\left(2\pi k \frac{n+m}{N}\right) \text{ for } 0 \leq k < N \quad (2)$$

where
k = frequency coefficient number,
n = input signal sample number,
N = sample block length,
m = phase term for E-TDAC,
x(n) = quantized value of input signal x(t) at sample n,
C(k) = DCT coefficient k, and
S(k) = DST coefficient k.

The E-TDAC transform alternately produces one of two sets of spectral coefficients or transform blocks for each signal sample block. These transform blocks are of the form $$\{C(k)\}_i = \begin{bmatrix} C(k) & \text{for } 0 \leq k < \frac{N}{2} \\ 0 & \text{for } k = \frac{N}{2} \end{bmatrix} \quad (3)$$

$$\{S(k)\}_i = \begin{bmatrix} S(k) & \text{for } 1 \leq k \leq \frac{N}{2} \\ 0 & \text{for } k = 0 \end{bmatrix} \quad (4)$$

where i = signal sample block number,

C(k) = DCT coefficient (see equation 1), and

S(k) = DST coefficient (see equation 2).

The computation algorithm used is the Fast Fourier Transform (FFT). See Cooley and Tukey, "An Algorithm for the Machine Calculation of Complex Fourier Series," *Math. Comput.*, vol. 19, 1965, pp. 297–301. A single FFT can be used to perform the DCT and DST simultaneously by defining them respectively as the real and imaginary components of a single complex transform. This technique exploits the fact the FFT is a complex transform, yet both input signal sample blocks consist only of real-valued samples. By factoring these transforms into the product of one FFT and an array of complex constants, the DCT coefficients emerge from the transform as the set of real values and the DST coefficients are represented by the set of imaginary values. Therefore the DCT of one signal sample block can be concurrently calculated with the DST of another signal sample block by only one FFT followed by complex array multiplication and additions.

The basic technique of using one FFT to concurrently calculate two transforms is well known in the art and is described in Brigham, *The Fast Fourier Transform*, Englewood Cliffs, NJ: Prentice-Hall, Inc., 1974. Additional information regarding the concurrent calculation of the modified DCT and DST for the E-TDAC transform may be found in Lookabaugh, "Variable Rate and Adaptive Frequency Domain Vector Quantization of Speech," Stanford, CA: Stanford University, PhD Thesis, June, 1988.

In a preferred embodiment for a one-channel version of the invention, two adjacent signal sample blocks are stored in buffers and transformed together into a DCT/DST block pair. The block pair is subsequently quantized and formatted for transmission or storage.

In two-channel systems, concurrent processing may be accomplished by processing a signal sample block from each of the two channels: a DCT block is generated for one channel, and a DST block is generated for the second channel. The coded blocks for a given channel alternate between the DCT and DST (see expression 5), and are always of the opposite type from that of the other channel's blocks. A pair of blocks, one for each channel, are quantized and formatted together.

Princen showed that with the proper phase component m (see equation 6) and a carefully designed pair of analysis-synthesis windows, the E-TDAC technique can accurately recover an input signal from an alternating sequence of cosine and sine transform blocks of the form $$\{C(k)\}_0, \{S(k)\}_1, \{C(k)\}_2, \{S(k)\}_3, \quad (5)$$

where each transform block represents one time-domain signal sample block. This process is shown in FIGS. 14a–14e, 15a–15d, and 16a–16g.

Referring to FIG. 14a, it may be seen that quantized input signal x(t) is grouped into blocks. One set of blocks, modulated by the window function $W_c$ shown in FIG. 14b, produces signal $x_c(t)$ shown in FIG. 14d. Signal $x_c(t)$ is input to the DCT. Another set of blocks of the sampled input signal x(t), which overlap the first set by one-half block length, are windowed by window function $W_s$ shown in FIG. 14c (which window function is identical to $W_c$ but shifted in time by one-half block length) producing signal $x_s(t)$ shown in FIG. 14e and subsequently passed to the DST.

Using only the alternate DCT and DST transform blocks results in a loss of the information contained in the discarded half of the transform blocks. This loss produces a time-domain aliasing component, but the distortion may be cancelled by choosing the appropriate phase term m for equations 1 and 2, applying the forward transform to overlapped time-domain signal sample blocks, and by overlapping and adding adjacent time-domain signal sample blocks recovered by the inverse transform.

The phase term m in equations 1 and 2 controls the phase shift of the time-domain aliasing distortion. FIGS. 15a–15d and 16a–16g illustrate this distortion. Signal $y_c(t)$, recovered from the inverse DCT, is shown in FIG. 15a. FIG. 15b illustrates that the recovered signal is composed of two components: the original windowed signal (solid line), and the time-domain aliasing distortion (dotted line). FIGS. 15c and 15d illustrate similar information for signal $y_s(t)$ recovered from the inverse DST. To cancel this alias distortion and accurately recover the original time-domain signal, E-TDAC requires the aliasing to be as follows. For the DCT, the time-domain alias component consists of the first half of the sampled signal reversed in time about the one-quarter point of the sample block, and the second half of the sampled signal reversed in time about the three-quarter point of the sample block. For the DST, the alias component is similar to that for the DCT except its amplitude is inverted in sign. See FIGS. 15b and 15d. The phase term required for alias cancellation is $$m = \frac{\frac{N}{2} + 1}{2} \quad (6)$$

where

N = sample block length.

E-TDAC also requires application of a pair of carefully designed analysis-synthesis windows to overlapped signal sample blocks. The signal sample blocks must have a 100% overlap, i.e., 50% of a given block is overlapped by the previous block, and 50% of the same block is overlapped by the following block. FIGS. 16a–16g illustrate the overlapping of signal sample blocks and the resulting cancellation of alias distortion. Signals $y_c(t)$ and $y_s(t)$ shown in FIG. 16a and 16d, recovered from the inverse DCT and DST, are modulated by window functions $W_c(t)$ and $W_s(t)$ respectively, shown in FIGS. 16b and 16e, to produce signals $\acute{y}_c(t)$ and $\acute{y}_s(t)$ shown in FIGS. 16c and 16f. When the overlapped blocks of these windowed signals are added, the alias components are cancelled and the resulting signal y(t) shown in FIG. 16g is an accurate reconstruction of the original input signal x(t).

Window design and overlap-add used during the synthesis process is discussed below in more detail. It is sufficient at this point to notice that omitting half the transform blocks halves the required bit rate, but the 100% window overlap required for E-TDAC during signal synthesis doubles the required bit rate. Consequently, E-TDAC has a neutral effect upon the required bit rate.

D. Nonuniform Quantization

Each transform coefficient derived from filter bank 104 is encoded and grouped into subbands by nonuniform quantizer 108. (Tables I and II show the assignment of transform coefficients to subbands.) The nonuniform quantizer is composed of block-floating-point encoder 105, adaptive bit allocator 106, and uniform quantizer 107 shown in FIG. 1a. Quantization is performed for transform block pairs: either two adjacent blocks in a one-channel system, or one block from each channel of a two-channel system. As depicted in FIG. 7, nonuniform quantization is comprised of five major sections: (1) calculating subband exponents, (2) determining the master exponents, (3) initially setting the bit length of each coefficient code word as a function of the coefficient's frequency, (4) adaptively allocating additional bits to specific code words, and (5) rounding and truncating the code word according to the bit length computed from the sum of the adaptive bit allocations and the minimum bit length based on the coefficient's frequency.

Floating-point representation of numerical quantities is well known in the art of digital data processing and is used to represent a wider range of values with fewer bits than is possible with integer representation. A floating-point number is composed of a mantissa and an exponent. In a preferred embodiment of the invention, the mantissa is a signed integer-valued expression expressed in two's complement form.

The corresponding exponent is an unsigned value equal to the power of two of the multiplier required to convert the mantissa (either normalized or unnormalized) into the true value of the represented numerical quantity. This representation can be expressed as $$F = M \cdot 2^{-E} \quad (7)$$

where
F = the value of the floating-point number,
M = the signed integer-valued mantissa, and
E = unsigned integer-valued exponent.
For example, an exponent of three indicates the true value of the floating-point number is obtained by multiplying the integer-valued mantissa by $2^{-3}$. This is equivalent to shifting a binary representation of the mantissa three places to the right.

A positive nonzero mantissa is said to be normalized when its most significant data bit is nonzero. A negative-valued mantissa is normalized when its most significant data bit is zero. A normalized mantissa insures the greatest number of significant bits for the numerical quantity is contained within the mantissa's limited bit length.

Block-floating-point representation is also well known in the art and is used to represent a set of floating-point numbers with fewer bits than is possible with conventional floating-point representation. This technique uses one exponent for a group of mantissas. Some mantissas in the group may not be normalized. The mantissa for the quantity with the largest magnitude in the group will be normalized provided it is not too small, i.e., the exponent is incapable of expressing the multiplier required for normalization. Whether the mantissas are normalized or not, however, the exponent always represents the number of times each integer-valued mantissa in the group must be shifted to the right to obtain the true value of the floating-point quantity.

1. Subband Exponents

The block-floating-point encoder comprises sections one and two of the nonuniform quantizer. The functions performed by the first section are shown in box 701 of FIG. 7. This section calculates the subband exponents for each of several subband frequency coefficients. The subbands are shown in Table I. The procedure is comprised of three steps. The first step finds the largest transform coefficient in each subband within one transform block and determines the number of left shifts required to normalize these largest 24-bit coefficients. The second step determines corresponding shift values for a second transform block. The third step compares the shift value for each subband in the first transform block with the corresponding subband's shift value in the second transform block, selects the smaller of the two, and saves it as the exponent for the appropriate subband in both blocks. The exponents are shared by the coefficient mantissas in each transform block.

2. Master Exponent

The second section of the nonuniform quantizer determines the value of a one-bit master exponent for each of two subband groups. The master exponent is used to expand the dynamic range of the coder. Referring to Table I, it may be seen that master exponent MEXP0 represents the low frequency subbands zero through eighteen. Master exponent MEXP1 represents high frequency subbands nineteen through thirty six. (For a 20 kHz coder, three additional subbands are required as shown in Table II.) If all subband exponents in a group are three or greater, the master exponent for that group is set to one and all subband exponents in that group are reduced by three. When a master exponent is set to one, it indicates that all coded coefficients within all subbands in the group are shifted to the left three more times than is indicated by the subband exponent values. When a master exponent is zero, each subband exponent in the group correctly represents the total left shifts for each transform coefficient in the subband. These master exponents permit using shorter subband exponents while allowing for a sufficient dynamic range. This step in the process is shown in boxes 702a and 702b of FIG. 7.

An additional step can be taken which may reduce the total bits required to represent the coded signal. In all subbands where an exponent represents a single coefficient, the sign bit of a normalized mantissa is superfluous. As disussed above, the sign bit and the most significant data bit in a normalized mantissa are always of opposite value. The sign bit can therefore be dropped by the encoder and restored by the decoder. The dropped sign bit is referred to herein as a "hidden bit."

Whether a mantissa is normalized can be determined by examining the exponent. If the exponent is less than its maximum value (which is 15 after adjusting for the master exponent in the floating point scheme used in the preferred embodiment of the invention), the mantissa is normalized. If the exponent is equal to its maximum value, no conclusion can be drawn, therefore it is assumed the mantissa is not normalized and there is no hidden bit.

This technique can be used only for those mantissas which have their own unique exponent. In a preferred embodiment of the invention, only DCT subband zero meets this requirement: it is comprised of only one transform coefficient and it does not share its exponent with a subband in the paired DST block. In coders which do not share exponents between pairs of transform blocks, the hidden bit technique may be used for all subbands containing only one coefficient.

The reduction in bit requirements is reflected in the fixed bit length for DCT coefficient zero. As shown in Table I, the "minimum" bit length of coefficient C(0) is 8 bits. If the hidden bit technique were not utilized, the fixed length for C(0) would be identical to that for coefficient S(0), or 9 bits.

3. Fixed-Bit Length

The third section of the nonuniform quantizer sets an initial minimum bit length for the representation of each left-shifted transform coefficient. This length is set according to the coefficient's frequency. Box 703 in FIG. 7 represents this section of the process and Table I shows the minimum number of bits fixed for each coefficient's code word. The minimum bit length was derived by comparing a representative filter bank response curve to a psychoacoustic masking threshold curve. Because filter performance is a function only of the difference in frequency between a signal and the coefficient's frequency, any frequency coefficient may be used to represent the filter bank's response. The response curve shown in FIG. 9 is obtained from the root mean square average of the filter's response to a range of frequencies within the filter passband. As discussed above, filter selectivity is affected by the shape of the analysis window and the number of samples in each time-domain signal block. It may be noted here that the overall coder characteristic response is not as good as that shown in FIG. 9 because an additional selectivity loss occurs during the signal synthesis process. This effect is discussed below and is also shown in FIGS. 17a and 17b.

Two psychoacoustic masking curves are shown in FIG. 9. These curves were derived from Fielder, "Evaluation of the Audible Distortion and Noise Produced by Digital-Audio Converters," *J. Audio Eng. Soc.*, vol. 35, 1988, pp. 517–534. Auditory selectivity of the human ear varies greatly with frequency, however, the 1 kHz curve is representative of ear characteristics for frequencies between 500 Hz and 2 kHz, and the 4 kHz curve is representative of the ear's response to higher frequencies. The rate of transition band rolloff and depth of stopband rejection for a transform coder must be as great as that for the psychoacoustic masking curve to achieve the lowest bit rates. In particular, note that ear selectivity for frequencies below a 1 kHz masking tone is very high.

Inadequate filter selectivity is compensated in part by reserving additional bits for lower frequency coefficients. FIG. 10 compares the filter response against the 4 kHz psychoacoustic masking curve. Because coder bandwidth and selectivity improve relative to the psychoacoustic masking curve as frequency increases, fewer bits are required to represent higher frequency transform coefficients. This relationship is reflected in the minimum bit length values as shown in Table I.

FIG. 11 compares the 1 kHz masking curve against the filter response curve which is offset such that the psychoacoustic masking curve is always higher. The offset for the filter response is due to the increased accuracy afforded by additional bits reserved for the lower-frequency coefficients. Each additional bit improves the signal-to-noise ratio approximately 6 db. The graph in FIG. 11 indicates an offset of 8 db (or approximately 1.3 additional bits of accuracy) may be necessary to encode a low-frequency transform coefficient if no other tones are present to contribute to the masking effect.

The minimum lengths suggested by the masking curves shown in FIGS. 9, 10, and 11 are conservative, however, because the curves shown in these figures represent the psychoacoustic masking effect produced by a single tone or a very narrow band of noise. FIG. 12 shows a composite masking curve derived from a simple overlay of the individual masking curves of three tones. Empirical evidence indicates that even this composite curve is very conservative, understating the actual masking effect of multiple tones. Furthermore, music is generally a more complex signal than a few discrete frequencies, and the resulting increase in masking levels permits a reduction in the required accuracy of transform coefficient code words. Consequently, the minimum bit lengths for all but DCT coefficient C(0) and DST coefficient S(1) shown in Table I are obtained by deducting three bits from the bit length of each coefficient code word suggested by the masking curves in FIGS. 10 and 11. Except for these two lowest-frequency coefficients, adaptive bit allocation provides additional bits where needed for increased accuracy of specific coefficients.

It transform coefficients zero and one were included in the adaptive bit allocation process, the E-TDAC coder would generate quantization noise at a frequency equal to the sample block rate whenever an input signal channel contains low-frequency spectral components whose period is large compared to the sample block length. This noise would be created within the channel containing such low-frequency components by the interaction of two mechanisms. First, the E-TDAC transform would convert the low-frequency components into an alternating sequence of nonzero and zero values for coefficient zero (DCT C(0) and DST S(0)). Coefficient C(0) would be nonzero in the DCT transform blocks but coefficient S(0) would always be zero in the DST transform blocks. Coefficient one (DCT C(1) and DST S(1)) would be affected to a lesser extent due to the filter bank's sidelobe leakage. Second, by including the two lowest frequency coefficients in the adaptive bit allocation process, the allocation algorithm for the channel would toggle between two bit assignment patterns, one for DCT blocks and the other for DST blocks. Because the number of adaptively assigned bits is fixed, bits assigned to coefficient C(0) in the DCT blocks would not be available for allocation to other transform coefficients as they would be in the DST blocks. (Because the value of coefficient S(0) is always zero, it would not be assigned any adaptively allocated bits.) This alternating allocation pattern would manifest itself as audible quantizing noise at a frequency equal to the sample block rate of 86.1 Hz (or 44.1 kHz/512).

The current embodiment of the invention assigns a fixed bit length of 8 bits to DCT coefficient C(0) and 9 bits to DST coefficient S(1) (see Table I) and excludes them from adaptive bit allocation. This exclusion prevents the adaptive allocation scheme from generating the quantization noise described in the previous paragraph.

4. Adaptive Bit Allocation a. Overview

The fourth section of the nonuniform quantizer performs the adaptive bit allocation. Box 704 in FIG. 7 provides an overview of this allocation process. In general, for each transform block, bit allocation assigns a fixed number of additional bits to specific coefficients in four phases. The number of bits may be chosen to balance signal coding quality and transmission bit rate. In a preferred embodiment of the invention, the allocation limit is set at 133 bits per transform block to achieve a total bit-rate of 128 kBits per second. In an application using error correction codes (discussed below), the limit must be reduced to 124 bits per transform block to maintain the same bit rate. This limit is referred to herein as the allocation maximum or as the number of allocable bits.

The current implementation assigns a maximum of 4 bits per coefficient. This maximum represents a design compromise between coding accuracy and total bit rate. It will be realized by one skilled in the art that this maximum and the total number of adaptively allocable bits may be altered without changing the concept or basic purpose of the invention.

Phase zero is an initialization process for the remaining phases. Phase one assigns bits, up to a maximum of four per transform coefficient, to the coefficients within the same critical band of those frequency components with the greatest spectral energy. If all allocable bits are assigned during phase one, the allocation process stops. If not, phase two allocates additional bits to the transform coefficients which were allocated bits during phase one such that the total adaptively allocated bits for each coefficient is four. If all allocable bits are assigned during phase two, the allocation process stops. If any bits remain, phase three allocates bits to those coefficients which are adjacent to coefficients that were allocated bits during phase one and two. A more detailed conceptual description of this procedure is provided in the following paragraphs. The actual logic implementation of the procedure is discussed later.

FIG. 8 is a diagram of the conceptual process used to adaptively allocate bits to specific transform coefficients. The initialization steps of phase zero are shown in box 800. The first step initializes the elements of an array A() to zero. The next step identifies the smallest subband exponent, which is the exponent for the subband with the largest spectral component, and saves the value as $X_{MIN}$. All subband exponents are subtracted from $X_{MIN}$ and the difference is stored in array M(). Note that the smallest possible subband exponent is zero and the largest possible subband exponent is eighteen, which is the sum of a maximum value of fifteen for a 4-bit high frequency subband exponent plus the value of three for the master exponent MEXP1. See Table I. Therefore, the range of possible values in array M() is negative eighteen to zero. In the next step, four is added to each element of array M() and all elements below zero are set to zero. At the end of phase zero, array M() consists of a set of elements, one for each subband, whose values range from zero to four. The elements with a value of four represent those subbands where at least one of the coefficients in the subband has one of the largest spectral coefficients in the total signal.

Phase one constructs another array A(), which represents the bits to be allocated to the coefficients in each subband, using the process shown in FIG. 8 box 801. Each element in A() corresponds to a subband. Recall from Table I that the higher subband exponents represent multiple transform coefficients, therefore each element of A() represents the number of bits assigned to all transform coefficients in the corresponding subband. For example, referring to Table I, subband 13 represents coefficients 13–14. If element A(13) has a value of one, this indicates that 2 bits are allocated, one each to transform coefficients 13 and 14. Continuing the example, if element A(36) has a value of two, then 30 bits are allocated, 2 bits each to coefficients 168–182. During the allocation process, as each element of A() is incremented, the number of allocated bits is deducted from the number of bits remaining for allocation.

When all of the allocable bits are assigned during this or any following phase, that phase immediately terminates and all of the subsequent phases are skipped. During the final step in which the allocation limit is reached, the number of bits assigned to a subband during that step will not exceed the number of bits remaining for allocation. If the last of the allocable bits are assigned while processing a subband with more than one coefficient, it is likely that not all of the coefficients in that subband will be allocated the same number of bits.

Starting with the M() array element representing the lowest-frequency coefficient (M(1) for DCT blocks, or element M(2) for DST blocks), each element of M() is examined in turn. As many as four passes are made through array M(), or until all allocable bits are allocated. On the first pass, each element in array A() is incremented by one if the corresponding element in array M() has a value equal to four. The second pass increments by one each element in A() which corresponds to each element in M() which has a value equal to three or four. On the third pass, array A() elements are incremented if the corresponding M() element has a value within the range of two to four. The final pass increments those elements in array A() corresponding to those M() elements which have a value in the range between one and four. It may be noted that if the elements in array M() sum to the allocation limit or less, the contents of arrays M() and A() at this point will be identical. If the number of bits assigned has reached the allocation limit, the bit-allocation process is complete at the end of phase one.

If any allocable bits remain, allocation continues with phase two shown in box 802 of FIG. 8. This phase makes as many as three passes through array A(), stopping earlier if and when the maximum allocable bits are assigned. Each pass starts with the lowest frequency element (A(1) for DCT blocks, or A(2) for DST blocks) and works upward in frequency. On the first pass through array A(), each element which has a value between one and three is incremented by one. On the second pass, elements with values of two or three are incremented. On the third pass, elements equal to three are incremented. If this phase completes without exceeding the allocation limit, every element in array A() will have a value of either four or zero.

If any allocable bits remain, allocation continues with phase three shown in box 803 of FIG. 8. Like the previous phases, phase three allocation will terminate as soon as the allocation limit has been reached. This final phase assigns additional bits to transform coefficients with lower spectral energy which are adjacent to subbands of coefficients with higher energy. This assignment is accomplished in three steps. The first steps scans array A() starting with the highest frequency element A(36) (element A(39) is the starting element in 20 kHz bandwidth coders) in search of a group of two adjacent elements which have the values {0,4}. If found, the element whose value is zero is set to one such that the group values become {1,4}.

If the allocation limit has not been reached, step two of phase three begins by scanning array A() downward starting with the highest frequency subband in search of a group of two adjacent elements which have the values {4,0}. If found, the zero-valued element is set to one to produce values {4,1}.

The third and final step of phase three allocates additional bits to the coefficients in subbands assigned bits in steps one and two of this phase. Starting at the highest frequency element of array A(), each element modified in step one is incremented. Finally, elements modified in step two are incremented, starting with the highest frequency subbands. This third step reiteratively increments the array elements in the same order discussed above until all allocable bits are assigned, or until all of the elements modified in steps one and two are assigned a total of 4 bits each. If the latter condition is met and any allocable bits remain to be assigned, phase three repeats starting with step one.

b. Adaptive Bit Allocation Logic

The concept of the adaptive bit allocation algorithm is represented in FIG. 8 and described above. An understanding of the algorithm's concept is helpful in gaining an understanding of the actual logic of the adaptive bit allocation routine.

Phase zero begins by initializing all elements of array A() equal to zero, and constructing four tables $T_1$ through $T_4$. The construction of the tables is accomplished through the following steps: (1) identify the smallest subband exponent and save this value as $X_{MIN}$; (2) starting with the lowest frequency subband (subband 1 for DCT blocks, or subband 2 for DST blocks), subtract the subband exponent (see Table I) from $X_{MIN}$; (3) if the difference is zero, insert the subband number into tables $T_1$, $T_2$, $T_3$, and $T_4$; (4) if the difference is negative one, insert the subband number into tables $T_1$, $T_2$, and $T_3$; (5) if the difference is negative two, insert the subband number into tables $T_1$, and $T_2$; (6) if the difference is negative three, insert the subband number into table $T_1$; (7) continue steps three through six for each subband until all subbands have been processed. At the end of this step, table $T_1$ contains the numbers of all subbands that have exponents in the range $X_{MIN}-3$ to $X_{MIN}$, table $T_2$ contains subbands with exponents from $X_{MIN}-2$ to $X_{MIN}$, table $T_3$ contains subbands with exponents from $X_{MIN}-1$ to $X_{MIN}$, and table $T_4$ contains subbands with exponents equal to $X_{MIN}$. Of significance, subband entries in each table are in ascending order according to frequency.

Phase one allocates bits to transform coefficients in subbands with the largest subband exponents. Starting with the first (lowest frequency) entry in table $T_4$, one bit is allocated to each transform coefficient within each subband represented in the table. The allocation is repeated in turn for table $T_3$, $T_2$, and finally table $T_1$. This process continues until all allocable bits have been assigned or until all entries in tables $T_4$ to $T_1$ have been processed. As a bit is assigned to all coefficients in a subband, an entry in array A() corresponding to that subband is incremented by one such that the elements in A() reflect the total bits allocated to each transform coefficient in each subband.

As noted earlier, allocation terminates immediately when all of the allocable bits are assigned. Each table entry represents a subband which, in general, contains multiple transform coefficients. Therefore, if the last of the allocable bits are assigned to a table entry representing a subband with more than one coefficient, it is probable that not all of the coefficients in that subband can be allocated the same number of bits. In such situations, the allocation process notes which coefficients in the subband must have a bit deducted from the subband's allocation amount subsequently stored in array A().

Phase two constructs four new tables, $T_1$ through $T_4$, using a procedure similar to that used in phase zero: (1) $X_{MIN}$ still retains the smallest subband exponent; (2) for the lowest frequency subband (subband 1 for DCT blocks, or subband 2 for DST blocks), subtract the subband exponent from $X_{MIN}$; (3) if the difference is zero, insert the subband number into table $T_4$; (4) if the difference is negative one, insert the subband number into table $T_3$; (5) if the difference is negative two, insert the subband number into table $T_2$; (6) if the difference is negative three, insert the subband number into table $T_1$; (7) continue steps three through six for each subband until all subbands have been processed. At the end of this step, table $T_1$ contains the numbers of all subbands that have exponents equal to $X_{MIN}-3$, table $T_2$ contains subbands with exponents equal to $X_{MIN}-2$, table $T_3$ contains subbands with exponents equal $X_{MIN}-1$, and table $T_4$ contains subbands with exponents equal to $X_{MIN}$. The entries in all of the tables are in ascending order according to the frequency of the transform coefficient.

Phase two assigns bits to all coefficients represented by subbands in tables $T_3$ to $T_1$ until each coefficient has received a total of four additional bits, or until the allocation limit has been reached. Starting with the first (lowest frequency) entry in table $T_3$, one bit is assigned to each coefficient contained within each subband represented in the table. As each subband is processed, the entry is removed from table $T_3$ and inserted into table $T_4$. Next, coefficients associated with entries in table $T_2$ are allocated an additional bit, moving each entry from table $T_2$ to $T_3$ as the additional bit is assigned. Then entries in table $T_1$ are processed, moving the entries from table $T_1$ to $T_2$. If any allocable bits remain, allocation continues by repeating the process for table $T_3$, and then table $T_2$. If bits remain to assign, a final pass is made through the entries in table $T_3$. If phase two does not assign all remaining allocable bits, table $T_4$ contains all of the coefficients, each having received 4 bits, and tables $T_3$ through $T_1$ are empty. If all allocable bits have been assigned, array A() is rebuilt from the information contained in tables $T_1$ through $T_4$ to reflect the total bits allocated to each transform coefficient. Each element in array A() corresponding to an entry in table $T_4$ is assigned a value of four. Each A() element corresponding to an entry in table $T_3$ is assigned a value of three; for table $T_2$ a value of two; and for table $T_1$ a value of one. All other elements of A(), i.e., those subbands which are not represented by entries in tables $T_1$ through $T_4$, are zero.

If any allocable bits remain, allocation continues with phase three. Table $T_4$ is sorted, ordering the subband numbers into descending frequency. The first step adds subbands to table $T_1$ which are not in table $T_4$ that are lower in frequency and adjacent to subbands which are in table $T_4$. Starting with the first (highest frequency) entry in table $T_4$, adjacent entries in the table are examined to determine if they are separated by one or more subbands. If they are, the number of the subband immediately below the higher subband is inserted into table $T_1$. For example, suppose two adjacent entries in table $T_4$ represent subbands 16 and 12. These two subbands are separated by three subbands. Therefore the number 15, representing the subband below subband 16, would be inserted into table $T_1$.

The second step adds subbands to table $T_1$ which are not in table $T_4$ that are higher in frequency and adjacent to subbands which are in table $T_4$. Starting with the first (highest frequency) entry in table $T_4$, adjacent entries in the table are examined to determine if they are separated by one or more subbands. If they are, the number of the subband immediately above the lower subband is inserted into table $T_1$. For example, suppose two adjacent entries in table $T_4$ represent subbands 16 and 12. As discussed above, these two subbands are separated by 3 subbands. Therefore the number 13, representing the subband above subband 12, would be inserted into table $T_1$.

Starting with the first entry in table $T_1$, an additional bit is assigned to each transform coefficient associated with each subband represented by an entry in table $T_1$. As each subband entry is processed, it is moved from table $T_1$ into table $T_2$. If any allocable bits remain at the end of processing table $T_1$, a similar process repeats for the entries in table $T_2$, moving each entry from table $T_2$ into table $T_3$. Processing continues with table $T_3$ entries if any bits remain to allocate, moving entries from table $T_3$ into table $T_4$. If any bits remain after this step, phase three repeats from the beginning, first determining if the entries in table $T_4$ are still sorted and if not, sorting table $T_4$ entries into descending frequency order. When all allocable bits have been assigned, array A() is built from the four tables as described above for phase two.

After all bits have been allocated, each transform coefficient code word is rounded off to a bit length equal to the value of the element of array A() representing the subband in which the coefficient is grouped. Some coefficients in one subband, however, may have one bit deducted from their length as required to keep the total number of allocated bits equal to the allocation maximum.

5. Code Word Truncation

The fifth section of the nonuniform quantizer, shown in box 705 of FIG. 7, follows the adaptive bit allocation routine. Using the subband and master exponents determined in previous sections, each transform coefficient in a transform block is shifted to the left a number of times equal to the value of the exponent for the subband in which the coefficient is grouped, plus three more shifts if the associated master exponent is set to one. Each coefficient's total bit length is then calculated by adding its minimum bit length (see Table I) to the number of adaptively allocated bits assigned to coefficients in each subband, found in array A(). Each transform coefficient code word is rounded off to this bit length.

As described above, each element of array A() represents the number of bits assigned to all coefficients within a subband. Some coefficients in one subband may have one bit deducted from their length as required to keep the total number of bits allocated to the transform block equal to the allocation maximum.

E. Formatting

The formatting process prepares a pair of encoded transform blocks for transmission or storage. This process is represented by box 109 in FIG. 1a. The following description discusses the formatting of two adjacent transforms locks in a one-channel system. The same technique is used to format one transform block from each channel of a two-channel system processing signals such as that used in stereophonic applications.

A fixed length representation of each transform coefficient code word is formed by truncating the rounded code word to a length equal to the minimum bit length shown in Table I. Any additional bits allocated to the code word are formatted separately in an adaptive bit block. The master exponents, subband exponents, truncated coefficient code words, and adaptive bit blocks are then assembled according to the grouping shown in FIG. 20. Note that one set of master and subband exponents applies to both transform blocks in the block pair. (See the discussion of the nonuniform quantizer above.) By sharing exponents between each pair of blocks, the total number of bits required to represent the exponents for both transform blocks is reduced by 50%.

The formatted frame of transform blocks in FIG. 20 depicts a structure where transform block A is a DCT block and block B is a DST block. If the frame will be subject to bit errors such as those caused by noise during transmission, error correction codes are intermixed with the data as shown in FIG. 21. Additional overhead bits may be required, such as frame synchronization bits if the digital signal is intended for transmission, or database pointers or record keys if the frames are intended for storage. If frame synchronization bits are required, the formatted frame is randomized using a technique described in Smith, *Digital Transmission System*, New York, N.Y.: Van Nostrand Reinhold Co., 1985, pp. 228–236. Randomization is performed to reduce the probability that valid data within the frame will be mistaken for the synchronization pattern. The randomized frame is then appended to the frame synchronization bits.

Note that each transform coefficient may be represented in as many as two distinct parts or segments. The first part represents the coefficient's minimum length and is composed of a fixed number of bits. See Table I. The second part of the representation, if present, is of varying length and is composed of the adaptively allocated bits. This two-part representation scheme is chosen over one which represents each coefficient as a variable length word because it is more immune to corruption by noise. If a noise burst occurs in a frame utilizing the preferred scheme, the effects of the noise will be confined to the value of the exponents, code words, or allocated bits directly affected by the noise. If a noise burst occurs in a frame utilizing variable length code words, the effects of the noise can be propagated through the remainder of the frame. This propagation may occur because the noise burst will alter not only the value of the exponents and code words hit directly by the noise, but also the information needed to determine the length of each variable length code word. If the length of one code word is in error, the remainder of the frame will be misinterpreted.

An encoded DCT transform block includes 183 coefficient mantissas comprising 537 bits (see Table I) and 133 adaptively allocated bits, for a total of 670 bits. Because DST coefficient S(0) is always zero (see Table I and expression 4), it need not be transmitted or stored. Therefore, the DST block mantissas and allocated bits comprise only 666 bits. The two master exponent bits and 37 subband exponents of 148 bits brings the DCT/DST block pair length to 1486 bits. (For the 20 kHz version of the invention, the total block-pair length is 1702 bits.)

No side-information is required to indicate the coefficients to which additional bits have been allocated. The deformatting process is able to determine the proper allocation from the transmitted subband exponents by performing the same allocation algorithm as that used in the encoding process.

When data corruption is not a problem, the best structure for formatting a frame of transform blocks is one which places the exponents first, coefficient code words second, and finally the adaptively allocated bits. This reduces processing delays because, after all subband exponents have been received, the deformatting process is able to determine bit allocations made to each transform coefficient while the adaptive bit blocks are being received. The formatting structure used in the preferred embodiment of the invention is shown in FIG. 20. The bit stream is formatted with the master and subband exponents in ascending frequency order. Then the fixed-length portion of the coefficient code words for transform block A are assembled in ascending frequency order, followed by the coefficient code words of transform block B. Finally, the adaptive bit blocks for block A are appended to the bit stream, followed by the adaptive bit blocks for block B.

In applications where potential data corruption is of concern, an error correction scheme is necessary. Errors in subband exponents, and to the lesser extent, errors in the lower-frequency coefficient code words generally produce the greatest audible distortion. This information is the most critical data to protect. A preferred scheme protects the master and subband exponents with error detection and correction codes, and separates these values as much as possible to improve their immunity to noise burst errors. Such a scheme is shown in FIG. 21.

It will be obvious to one skilled in the art that other frame formats and correction codes may be utilized without departing from the basic invention.

When error correction codes are employed, fewer adaptively allocated bits are used in order to maintain the same total bit rate. The total number of exponent and mantissa bits for one frame of a DCT/DST block pair is 1220 bits. Of this length, 150 bits are subband and master exponents. One (21, 19) Reed-Solomon error correction code is added to the bit stream. The code, sixteen bits in length, provides single-symbol error detection/correction for as many as nineteen 8-bit symbols (bytes), or 152 bits. See, for example, Peterson and Weldon, *Error-Correcting Codes*, Cambridge, Mass.: The M. I. T. Press, 1986, pp. 269-309, 361-362.

Of the 152 bits which may be protected by the code, 150 constitute the master and subband exponent bits (15 kHz version). The remaining error correction capacity is utilized by providing redundant protection for the two master exponents. A total of eighteen bits are required to represent the 16-bit error code and redundant master exponents. These bits are added to the formatted data stream without increasing the overall data rate by reducing the number of bits available for adaptive bit allocation. As a result, the total allocable bits for each block in the transform block pair is reduced from 133 to 124.

The Reed-Solomon codes process data in bytes, therefore the error codes, protected data, and unprotected data are grouped into 8-bit bytes for ease of processing. The ratio of protected data to unprotected data in each block-pair frame is approximately nine-to-one. This permits scattering protected data throughout the formatted frame, each 8-bit byte of protected data separated by eight bytes of unprotected data. See FIG. 21. With this technique, a single burst error of as many as 65 bits may occur anywhere in the frame without corrupting more than one protected data byte. Therefore, protected data can be recovered from any single noise burst no longer than 65 bits in length.

Subject to the constraints discussed above, exponents and transform coefficient code words are assembled in ascending frequency order, and are followed by the adaptive bit blocks.

F. Transmission or Storage

The formatted frame is now ready for transmission or for storage. FIG. 1a illustrates transmission means 110. Transmission media include public dissemination such as broadcasting, internal use such as studio monitoring or signal mixing, and interfacility or telephonic use via terrestrial or satellite links. Storage media include magnetic tape and magnetic or optical disks.

G. Deformatting

A deformatting process takes place when the digitized and coded signal is received from transmission means 111 either by receipt of a transmitted signal or retrieved from storage. The process is represented by box 112 in FIG. 1b. If the formatted frame of code words was randomized prior to transmission, the formatted frame is recovered by an inverse randomizing process. Then the frame is split into the component parts of each transform block: the master exponents, subband exponents, fixed length portion of transform coefficient code words, and adaptively assigned bits. Error correction codes, if present, may be used to rectify errors introduced during transmission or storage.

Each of the master exponent bits are checked with its corresponding redundant bit to verify accuracy. If this check fails, i.e., a master exponent and its redundant counterpart are not equal, the value of the master exponent is assumed to be one. If the correct value of the master exponent is actually zero, this assumption will reduce the amplitude of all transform coefficients within the subbands grouped under the errant master exponent. This assumption produces less objectionable distortion than erroneously setting a master exponent to zero (when it should be one) which would increase the amplitude of all affected coefficients.

The exponent for DCT coefficient C(0) is also checked to determine if any hidden bit adjustments are necessary.

The adaptive bit allocation routine discussed above is used to process the exponents extracted from the received signal, and the results of this process are used to determine the proper allocation of the adaptive bit blocks to the transform coefficients. The portion of each transform coefficient whose length equals the minimum bit length plus any adaptively allocated bits are loaded into a 24-bit word and then shifted to the right a number of times equal to the value of the appropriate subband exponent plus three additional shifts if the associated master exponent is set to one. This process is represented by box 113 in FIG. 1b.

H. Synthesis Filter Bank—Inverse Transform

Box 114 in FIG. 1b represents a bank of synthesis filters which transform each set of frequency-domain coefficients recovered from the deformatting and linearization procedures into a block of time-domain signal samples. An inverse transform from that used in analysis filter bank 104 in FIG. 1a implements synthesis filter bank 114. The inverse transforms for the E-TDAC technique used in this embodiment of the invention are alternating applications of a modified inverse DCT and a modified inverse DST. Because half of the transform blocks are omitted from transmission or storage (see expression 5), those blocks must be recreated for the inverse transforms. The missing DCT blocks may be recreated from the available DCT blocks as shown in equation 8. The missing DST blocks may be recreated as shown in equation 9. The inverse DCT is expressed in equation 10, and the inverse DST is expressed in equation 11.

$$\hat{C}(k) = -\hat{C}(N - k) \text{ for } N/2 \leq k < N \quad (8)$$

$$\hat{S}(k) = \hat{S}(N - k) \text{ for } N/2 < k \leq N \quad (9)$$

$$\hat{x}(n) = \frac{1}{N} \sum_{k=0}^{N-1} \hat{C}(k)\cos\left(2\pi k \frac{n + m}{N}\right) \text{ for } 0 \leq n < N \quad (10)$$

$$\hat{x}(n) = \frac{1}{N} \sum_{k=0}^{N-1} \hat{S}(k)\sin\left(2\pi k \frac{n + m}{N}\right) \text{ for } 0 \leq n < N \quad (11)$$

where
k = transform coefficient number,
n = signal sample number,
N = sample block length,
m = phase term for E-TDAC (see equation 6),
$\hat{C}(k)$ = quantized DCT coefficient k,
$\hat{S}(k)$ = quantized DST coefficient k, and
$\hat{x}(n)$ = recovered quantized signal x(n).

Calculations are performed using an FFT algorithm. The same techniques as those employed in the forward transform are used in the inverse transform to permit concurrent calculation of both the DCT and DST using a single FFT.

FIGS. 14a-14e and 16a-16g illustrate the transform process of the analysis-synthesis filter banks. The analysis filter bank transforms the time-domain signal into an alternating sequence of DCT and DST blocks. The inverse transform applies the inverse DCT to every other block, and applies the inverse DST to the other half of the blocks. As shown in FIGS. 15a-15d, the recovered signal contains aliasing distortion. This distortion is cancelled during a subsequent time-domain block overlap-add process represented by box 116 in FIG. 1b. The overlap-add process is discussed below.

I. Synthesis Window

FIGS. 16a-16g illustrate cancellation of time-domain aliasing by the overlap-add of adjacent time-domain signal sample blocks. As derived by Princen, to cancel time-domain aliasing distortion, the E-TDAC transform requires the application of a synthesis window identical to the analysis window and an overlap-add of adjacent blocks. Each block is overlapped 100%; 50% by the previous block and 50% by the following block. Synthesis-window modulation is represented by box 115 in FIG. 1b.

Analysis-synthesis window design must consider filter bank performance. Because both windows are used to modulate the time-domain signal, the total effect upon filter performance is similar to the effect caused by a single window formed from the product of the two windows. Design of the analysis-synthesis product-window is highly constrained, reducing flexibility in trading off the steepness of transition band rolloff and the depth of stopband rejection. As a result, filter performance is degraded to a greater extent than it is by an analysis-only window designed without this constraint. For example, see FIGS. 17a and 17b.

While analysis windows have received much attention, the prior art teaches little about synthesis windows. The technique described below derives a good analysis-synthesis window pair from a known good analysis-window design. While any analysis window may be used, several windows permit design of a filter bank with good selectivity, and they offer a means to trade off steepness of transition band rolloff against depth of stopband rejection. Three examples are the Kaiser-Bessel window, the Dolph-Chebyshev window, and a window derived from finite impulse filter coefficients using the Parks-McClellan method. See Parks and McClellan, "Chebyshev Approximation of Nonrecursive Digital Filters with Linear Phase, "IEEE Trans. Circuit Theory, vol. CT-19, March 1972, pp. 189-94. Only the Kaiser-Bessel window is discussed here. This window allows the trade off mentioned above through the choice of a single parametric alpha value. As a general rule, low alpha values improve transition band rolloff, and high alpha values increase the depth of stopband rejection. See Harris, cited above.

An alpha value in the range of 4 through 7 is usable in the preferred embodiment of the invention. This range provides a good compromise between steepness of transition band rolloff at mid-frequencies (1-2 kHz), and depth of stopband rejection for low frequencies (below 500 Hz) and high frequencies (above 7 kHz). The range of acceptable alpha values was determined using computer simulations by identifying the lowest alpha values which have sufficient stopband rejection to keep quantizing noise below the psychoacoustic masking threshold. See FIG. 19.

The Kaiser-Bessel window function is $$W(n) = \frac{I_0\left[\pi\alpha\sqrt{1 - \left(\frac{n}{N/2}\right)^2}\right]}{I_0[\pi\alpha]} \text{ for } 0 \leq n < N \quad (12)$$

where
$\alpha$ = Kaiser-Bessel alpha factor,
n = window sample number,
N = window length in number of samples, and $$I_0[x] = \sum_{k=0}^{\infty} \frac{(x/2)^k}{k!}.$$

To satisfy the overlap-add criteria, an analysis-synthesis product-window WP(n) of length N is derived by convolving window W(n) of length v+1 with a rectangular window of length N−v. The value v is the window overlap-add interval. The overlap-add process cancels alias distortion and the modulation effects of the analysis and synthesis windows. The convolution which derives the product window is shown in equation 13, where the denominator of the expression scales the window such that its maximum value approaches but does not exceed unity. This expression may be simplified to that shown in equation 14.

$$WP(n) = \frac{\sum_{k=0}^{N-1} s(k)W(n-k)}{\sum_{k=0}^{v} W(k)} \quad \text{for } 0 \leq n < N \quad (13)$$

$$WP(n) = \frac{\sum_{k=0}^{N-v-1} W(n-k)}{\sum_{k=0}^{v} W(k)} \quad \text{for } 0 \leq n < N \quad (14)$$

where
n = product-window sample number,
v = number of samples within window overlap interval,
N = desired length of the product-window,
W(n) = beginning window function of length v+1,
WP(n) = derived product-window of length N, and $$s(k) = \begin{bmatrix} 1 & \text{for } 0 \leq k < N - v \\ 0 & \text{otherwise.} \end{bmatrix}$$

The analysis and synthesis windows shown in equations 15 and 16 are obtained by taking the derived product-window WP(n) to the A and S powers respectively.

$$WA(n) = WP(n)^A \text{ for } 0 \leq n < N \quad (15)$$

$$WS(n) = WP(n)^S \text{ for } 0 \leq n < N \quad (16)$$

where
WP(n) = derived product-window (see equations 13 and 14),
WA(n) = analysis window,
WS(n) = synthesis window,
N = length of the product-window, and
A + S = 1.

In the current embodiment of the invention, the analysis and synthesis windows have a length of 512 samples with a 100% window overlap, or an overlap interval of 256 samples. The values of A and S are each set to one-half which produces a pair of indentical analysis and synthesis windows as required by the E-TDAC transform. Substituting these values into equation 14, the resulting analysis window is seen to be $$WA(n) = \sqrt{\frac{\sum_{k=0}^{255} W(n-k)}{\sum_{k=0}^{256} W(k)}} \quad \text{for } 0 \leq n < N \quad (17)$$

where
W(n) = Kaiser-Bessel function of length 257, and the alpha factor is in the range 4 to 7.

J. Overlap-Add

An additional requirement is placed upon window design: the analysis and synthesis windows must be designed such that the analysis-synthesis product-window always sums to unity when two adjacent product-windows are overlapped. This requirement is imposed because an overlap-add process is used to cancel the time-domain effects of the analysis- and synthesis-window modulation. This process is represented by box 116 in FIG. 1b, and illustrated in FIGS. 16a–16g. Signals $y_c(t)$ and $y_s(t)$, recovered from the inverse DCT and DST respectively, are shown in FIGS. 16a and 16d. Each signal is grouped into a series of blocks. Each signal block is modulated by the synthesis-window functions shown in FIGS. 16b and 16e. The resulting blocks of signals $\hat{y}_c(t)$ and $\hat{y}_s(t)$ are shown in FIGS. 16c and 16f. The two signals, overlapped by one-half block length, are added to produce signal y(t), shown in FIG. 16g. Signal y(t) is an accurate reconstruction of the original input signal.

As shown in FIG. 18, a signal sample at some time $n_ot$ within the overlap interval between block k and block k+1 is represented by a sample in each of the two blocks. Following an overlap-add of the two windowed blocks, the recovered signal sample at time $n_ot$ is seen to be the sum of the samples from windowed blocks k and k+1, which may be expressed as $$x(n_ot) = WP_k(n_ot) \cdot x(n_ot) + WP_{k+1}(n_ot) \cdot x(n_ot) \quad (18)$$

where
$WP_k(n_ot) = WA_k(n_ot) \cdot WS_k(n_ot)$,
$WA_k(n_ot)$ = analysis window in block k at time $n_ot$, and
$WS_k(n_ot)$ = synthesis window in block k at time $n_ot$.

The product-window modulation effects are cancelled if the sum of the two adjacent product-windows across the window overlap interval equals unity. Therefore, signal x(nt) may be accurately recovered if $$WP_k(nt) + WP_{k+1}(nt) = 1 \quad \text{for } 0 \leq n < N \quad (19)$$

for all time samples nt within the overlap interval between block k and block k+1.

It is difficult to work with the product-window as a function of time, so it is desirable to translate the requirement as expressed in equation 19 into a function of window sample number n. Equations 20 through 23 express this requirement for a product-window created from the product of a pair of 512 sample analysis and synthesis windows with 100% overlap. Equation 20 represents the overlap of the first half of window $WP_k$ and the last half of the previous window $WP_{k-1}$. Equation 21 represents the overlap of the last half of window $WP_k$ and the first half of the following window $WP_{k+1}$. Equations 22 and 23 show the equivalent expressions in terms of the analysis and synthesis windows.

$$WP_{k-1}(n+256) + WP_k(n) = 1 \quad \text{for } 0 \leq n < 256 \quad (20)$$

$$WP_k(n) + WP_{k+1}(n-256) = 1 \quad \text{for } 256 \leq n < 512 \quad (21)$$

$$WA_{k-1}(n+256) \cdot WS_{k-1}(n+256) + WA_k(n) \cdot WS_k(n) = 1 \text{ for } 0 \leq n < 256 \quad (22)$$

$$WA_k(n) \cdot WS_k(n) + WA_{k+1}(n-256) \cdot WS_{k+1}(n-256) = 1 \text{ for } 256 \leq n < 512 \quad (23)$$

where
WP$_k$(n)=WA$_k$(n)·WS$_k$(n),
WA$_k$(n)=analysis window value for sample n in block k, and
WS$_k$(n)=synthesis window value for sample n in block k.

K. Signal Output

Box 117 in FIG. 1b represents a conventional digital-to-analog converter which generates a varying voltage analog signal in response to a digital input. The digital input is obtained from the 16 most significant bits of the 24-bit integer words produced by the overlap-add process. The analog output should be filtered by a low-pass filter with a passband bandwidth of 15 kHz (20 kHz for the 20 kHz coder) to remove spurious high-frequency components. This filter is not shown in FIG. 1b.

II. ALTERNATIVE O-TDAC IMPLEMENTATION OF INVENTION

Another embodiment of the invention employs an alternate transform referred to herein as Oddly-Stacked Time-Domain Aliasing Cancellation (O-TDAC). The following description discusses the differences in implementation between the E-TDAC and O-TDAC versions of the invention.

A. Forward Transform

O-TDAC utilizes a transform function which is a modified Discrete Cosine Transform (DCT), shown in equation 24.

$$C(k) = \sum_{n=0}^{N-1} x(n)\cos\left[2\pi\left(k + \frac{1}{2}\right)\frac{n+m}{N}\right] \text{ for } 0 \leq k < N \quad (24)$$

where
k=frequency coefficient number,
n=input signal sample number,
N=sample block length,
m=phase term for O-TDAC (see equation 6),
x(n)=quantized value of input signal x(t) at sample n,
C(k)=DCT coefficient k.

The O-TDAC transform produces a set of spectral coefficients or transform blocks of the form $$\{C(k)\}_i = \begin{bmatrix} C(k) & \text{for } 0 \leq k < \frac{N}{2} \\ 0 & \text{for } k = \frac{N}{2} \end{bmatrix} \quad (25)$$

where
i=signal sample block number, and
C(k)=DCT coefficient (see equation 24).

The computation algorithm used is the Fast Fourier Transform (FFT). Unlike the E-TDAC version, the O-TDAC implementation does not use a single FFT to concurrently transform two signal sample blocks. The computational complexity of the transform is reduced, however, by employing a technique similar to the premultiply-transform-postmultiply process used in the E-TDAC version. The premultiply step converts the real valued sequence of signal samples x(n) into a complex valued sequence by modulating the signal samples by the complex function $$e^{-j\pi\frac{n}{N}} \quad (26)$$

where
j=√−1,
n=input signal number, and
N=sample block length.

A Discrete Fourier Transform implemented by a FFT transforms the modified signal samples into a set of transform coefficients. Because the FFT is a complex transform, the real and imaginary parts of the modified signal sample set can be transformed concurrently. Finally, a postmultiply step obtains the true DCT coefficients. This process is represented below in equations 27 and 28.

$$X^*(k) = FFT[x(n)e^{-j\pi\frac{n}{N}}] \quad (27)$$

$$C(k) = R(k)\cos\left[2\pi\left(k + \frac{1}{2}\right)\frac{m}{N}\right] + Q(k)\sin\left[2\pi\left(k + \frac{1}{2}\right)\frac{m}{N}\right] \quad (28)$$

where
j=√−1,
n=input signal sample number,
N=sample block length,
k=frequency coefficient number,
m=phase term for O-TDAC (see equation 6),
R(k)=real part of coefficient X*(k),
Q(k)=imaginary part of coefficient X*(k), and
C(k)=DCT coefficient k.

In a preferred embodiment for a one-channel version of the invention, two consecutive overlapped signal sample blocks are stored in buffers and transformed together using two FFT processes into a DCT$_1$/DCT$_2$ block pair. In two-channel systems, signal sample blocks from each of the two channels are transformed by two FFT processes into a DCT$_1$/DCT$_2$ block pair.

Princen showed that with the proper phase component m (see equation 6) and a carefully designed pair of analysis-synthesis windows, the O-TDAC technique can accurately recover an input signal from an alternating sequence of cosine transform blocks of the form $$\{C1(k)\}_0,\{C2(k)\}_1, \{C1(k)\}_2, \{C2(k)\}_3, \quad (29)$$

where
C1(k)$_i$=DCT$_1$ coefficient k of signal sample block i, and
C2(k)$_i$=DCT$_2$ coefficient k of signal sample block i.

Note that this sequence of transform blocks is formed by discarding, in effect, every other transform block from each channel in a two-channel system, or every other transform block from each of both DCT used in a single channel system.

The O-TDAC transformation and alias cancellation process is very similar to that for the E-TDAC transform, and is illustrated in FIGS. 22a-22e, 23a-23d, and 24a-24g. The principal difference is the form of the alias component. For the first half of the sampled signal block, the alias component is a time reversed image of the input signal about the one-quarter point of the sample block, but the sign of its amplitude is inverted from that of the input signal. For the second half of the sampled signal block, the aliasing is time reversed about the three-quarter point of the sample block with no change in sign. See FIGS. 23b and 23d.

The design and use of analysis and synthesis window is identical to that for E-TDAC. See FIGS. 24a-24g.

B. Nonuniform Quantizer

The nonuniform quantizer for the O-TDAC version of the invention is identical to that used with the E-TDAC transform version with only a few minor differences due to the fact only DCT blocks are present. In each block pair, both transform blocks include coefficient C(0), therefore, all subband exponents are shared by the two blocks. Consequently, there can be no hidden bit and the "minimum" bit length for coefficient C(0) is fixed at nine bits (as opposed to eight bits for E-TDAC). See Table III.

Dynamic bit allocation is virtually the same as that for E-TDAC. Coefficient C(0) is excluded from the allocation process for both blocks in each pair, and because of the increased length of each transform block pair, discussed below, the allocation limit is only 130 bits.

C. Formatting and Deformatting

Each encoded DCT block includes 183 coefficient mantissas comprising 538 bits (see Tables I and III) and 130 adaptively allocated bits, for a total of 668 bits each. The two master exponents and 37 subband exponents of 148 bits shared by both DCT blocks brings the DCT$_1$/DCT$_2$ block pair length to 1486 bits, the same as that for the E-TDAC implementation.

The structure of the formatted frame without error correction codes is very similar to that used in the E-TDAC version of the invention, and is shown in FIG. 25. The frame structure with error correction codes is identical to that for E-TDAC, and is shown in FIG. 21.

The deformatting process is identical to that described above except no checks are made for any hidden bits.

D. Inverse Transform

Half of the DCT blocks are omitted from transmission or storage, and are recreated from the available DCT blocks using the relationship shown in equation 30. The inverse DCT is shown in equation 31.

$$\hat{C}(k) = -\hat{C}(N - k) \text{ for } N/2 \leq k < N \tag{30}$$

$$\hat{x}(n) = \frac{1}{N} \sum_{k=0}^{N-1} \hat{C}(k) \cos\left[2\pi\left(k + \frac{1}{2}\right)\frac{n+m}{N}\right] \text{ for } 0 \leq n < N \tag{31}$$

where
k = transform coefficient number,
n = signal sample number,
N = sample block length,
m = phase term for E-TDAC (see equation 6),
$\hat{C}(k)$ = quantized DCT coefficient k, and
$\hat{x}(n)$ = recovered quantized signal x(n).

The O-TDAC implementation of the inverse transform reduces computational complexity by employing a similar premultiply-transform-post multiply process as that used in the forward transform. This process converts the real-valued DCT coefficients into a set of modified complex valued coefficients, concurrently transforms the real and imaginary parts of the modified coefficients using a single inverse FFT (IFFT), and obtains the time-domain signal from postmultiplication, as shown in the following equations.

$$x^*(n) = IFFT[C(k)e^{-j2\pi k \frac{m}{N}}] \text{ for } 0 \leq n < N \tag{32}$$

$$\hat{x}(n) = r(n)\cos\left[\pi\frac{n+m}{N}\right] - q(n)\sin\left[\pi\frac{n+m}{N}\right] \text{ for } 0 \leq n < N \tag{33}$$

where
$j = \sqrt{-1}$,
m = phase term for O-TDAC (see equation 6),
N = sample block length,
k = frequency coefficient number,
n = input signal sample number,
r(n) = real part of sample x*(n),
q(n) = imaginary part of sample x*(n), and
$\hat{x}(n)$ = recovered quantized signal x(n).

Subsequent windowing, overlap-adding, and signal output processing is identical to that described above for the E-TDAC implementation of the invention.

TABLE I

Frequency Coefficients for 15 kHz E-TDAC Coder

| Master Exp | Subband Exp | Exp Ln | Coefficient Numbers | Minimum Bit Ln |
|---|---|---|---|---|
| MEXP0 | EXP0 | 4 bits* | 0 | 8 bits* |
| | EXP1 | | 1 | 5 bits+ |
| | EXP2 | | 2 | |
| | EXP3 | | 3 | |
| | EXP4 | | 4 | |
| | EXP5 | | 5 | |
| | EXP6 | | 6 | |
| | EXP7 | | 7 | |
| | EXP8 | | 8 | |
| | EXP9 | | 9 | |
| | EXP10 | | 10 | |
| | EXP11 | | 11 | |
| | EXP12 | | 12 | |
| | EXP13 | | 13-14 | 4 bits |
| | EXP14 | | 15-16 | |
| | EXP15 | | 17-18 | |
| | EXP16 | | 19-20 | |
| | EXP17 | | 21-22 | |
| | EXP18 | | 23-24 | |
| MEXP1 | EXP19 | | 25-27 | |
| | EXP20 | | 28-30 | |
| | EXP21 | | 31-33 | |
| | EXP22 | | 34-37 | |
| | EXP23 | | 38-41 | |
| | EXP24 | | 42-46 | |
| | EXP25 | | 47-53 | 3 bits |
| | EXP26 | | 54-60 | |
| | EXP27 | | 61-67 | |
| | EXP28 | | 68-77 | |
| | EXP29 | | 78-87 | |
| | EXP30 | | 88-97 | |
| | EXP31 | | 98-107 | |
| | EXP32 | | 108-122 | 2 bits |
| | EXP33 | | 123-137 | |
| | EXP34 | | 138-152 | |
| | EXP35 | | 153-167 | |
| | EXP36 | | 168-182 | |

*The DST always produces a zero value for coefficient S(0). This is known a priori by the decoder, therefore the exponent and mantissa for S(0) need not be transmitted or stored.
+The bit length for DST coefficient S(1) is 9 bits. The length for DCT coefficient C(1) is 5 bits as shown in the table.

TABLE II

| Frequency Coefficients for 20 kHz E-TDAC Coder | | | | |
|---|---|---|---|---|
| Master Exp | Subband Exp | Coefficient Exp Ln | Numbers | Minimum Bit Ln |
| MEXP1 | EXP37 | 4 bits | 183–199 | 2 bits |
|  | EXP38 |  | 200–216 |  |
|  | EXP39 |  | 217–233 |  |

Subbands 0–36 same as for 15 kHz coder (Table I).

TABLE III

| Frequency Coefficients for the O-TDAC Coder | | | | |
|---|---|---|---|---|
| Master Exp | Subband Exp | Coefficient Exp Ln | Numbers | Minimum Bit Ln |
| MEXP0 | EXP0 | 4 bits | 0 | 9 bits |

Subbands 1–36 same as for E-TDAC (Table I).
Subbands 37–39 same as for E-TDAC (Table II).

We claim:

1. An encoder for the encoding of digital information, said digital information comprising signal sample blocks representing analog audio signals, comprising
    means for generating subband information blocks, each subband information block comprising a set of digital words generated in response to a signal sample block, said means comprising means for applying a discrete transform function to each of said signal sample blocks, and
    means for quantizing with a fixed number of bits one or more digital words corresponding to at least the lowest frequency spectral component of said analog audio signals, but not quantizing all digital words with a fixed number of bits.

2. An encoder for the encoding of digital information, said digital information comprising signal sample blocks representing analog audio signals, comprising
    means for defining subbands and for generating subband information blocks, each subband information block comprising a set of digital words generated in response to a signal sample block, and
    means for quantizing with a fixed number of bits one or more digital words corresponding to at least the lowest frequency spectral component of said analog audio signals, and for quantizing one or more digital words with a fixed number of bits and an adaptive number of bits.

3. An encoder according to claims 1 or 2 further comprising means for grouping a plurality of subband information blocks, and for representing a plurality of said digital words in block-floating-point form comprising a mantissa associated with an exponent, said exponent being shared by mantissas from a plurality of subbands in said plurality of subband information blocks.

4. An encoder according to claims 1 or 2 further comprising means for representing one or more of said digital words in block-floating-point form comprising a mantissa associated with an exponent, for normalizing at least one mantissa, and for dropping a sign bit for a single normalized mantissa uniquely associated with an exponent whenever the value of said sign bit can be established from the value of a most significant data bit in said normalized mantissa.

5. An encoder according to claims 1 or 2, wherein said analog audio signals represent a plurality of audio channels, further comprising means for grouping a plurality of subband information blocks, each block in said plurality of subband information blocks corresponding to a respective one channel of said plurality of audio channels, and for representing a plurality of said digital words in block-floating-point form comprising a mantissa associated with an exponent, said exponent being shared by mantissas from a plurality of subbands in said plurality of subband information blocks.

6. A decoder for the recovery of digital information from a coded signal, said digital information representing analog audio signals, comprising
    means for reconstructing digital words from said coded signal, said means reconstructing with a fixed number of bits one or more digital words corresponding to at least the lowest frequency spectral component of said analog audio signals, but not reconstructing all digital words with a fixed number of bits, and
    means for generating signal sample blocks in response to said digital words, said means comprising means for applying an inverse discrete transform function to the reconstructed digital words.

7. A decoder for the recovery of digital information from a coded signal, said digital information representing analog audio signals, comprising
    means for reconstructing digital words from said coded signal, said means reconstructing with a fixed number of bits one or more digital words corresponding to at least the lowest frequency spectral component of said analog audio signals, and for reconstructing one or more digital words with a fixed number of bits and an adaptive number of bits, and
    means for generating signal sample blocks in response to said digital words.

8. A decoder according to claims 6 or 7, wherein said coded signal comprises mantissas associated with exponents, further comprising means for reconstructing a plurality of digital words from a plurality of mantissas sharing an exponent.

9. A decoder according to claims 6 or 7 further comprising means for reconstructing any missing sign bit for any of said digital words comprising a normalized mantissa uniquely associated with an exponent.

10. A decoder according to claim 8, wherein said analog audio signals represent a plurality of audio channels, each digital word in said plurality of digital words corresponding to a respective one of said plurality of audio channels, further comprising means for generating a plurality of signal sample blocks in response to said plurality of digital words, each one of said plurality of signal sample blocks corresponding to digital information representing a respective one of said plurality of audio channels.

11. A system comprising an encoder according to claim 1 and a decoder according to claim 6.

12. A system comprising an encoder according to claim 2 and a decoder according to claim 7.

13. An encoding method for the encoding of digital information, said digital information comprising signal sample blocks representing analog audio signals, comprising
    generating subband information blocks, each subband information block comprising a set of digital words generated in response to a signal sample block, by applying a discrete transform function to each of said signal sample blocks, and
    quantizing with a fixed number of bits one or more digital words corresponding to at least the lowest frequency spectral component of said analog audio signals, but not quantizing all digital words with a fixed number of bits.

14. An encoding method for the encoding of digital information, said digital information comprising signal sample blocks representing analog audio signals, comprising
    defining subbands and generating subband information blocks, each subband information block comprising a set of digital words generated in response to a signal sample block, and
    quantizing with a fixed number of bits one or more digital words corresponding to at least the lowest frequency spectral component of said analog audio signals, and quantizing one or more digital words with a fixed number of bits and an adaptive number of bits.

15. An encoding method according to claims 13 or 14 further comprising grouping a plurality of subband information blocks, and representing a plurality of said digital words in block-floating-point form comprising a mantissa associated with an exponent, said exponent being shared by mantissas from a plurality of subbands in said plurality of subband information blocks.

16. An encoding method according to claims 13 or 14 further comprising representing one or more of said digital words in block-floating-point form comprising a mantissa associated with an exponent, normalizing at least one mantissa, and dropping a sign bit for a single normalized mantissa uniquely associated with an exponent whenever the value of said sign bit can be established from the value of a most significant data bit in said normalized mantissa.

17. An encoding method according to claims 13 or 14, wherein said analog audio signals represent a plurality of audio channels, further comprising grouping a plurality of subband information blocks, each block in said plurality of subband information blocks corresponding to a respective one channel of said plurality of audio channels, and representing a plurality of said digital words in block-floating-point form comprising a mantissa associated with an exponent, said exponent being shared by mantissas from a plurality of subbands in said plurality of subband information blocks.

18. A decoding method for the recovery of digital information from a coded signal, said digital information representing analog audio signals, comprising
    reconstructing with a fixed number of bits one or more digital words corresponding to at least the lowest frequency spectral component of said analog audio signals, but not reconstructing all digital words with a fixed number of bits, and
    generating signal sample blocks in response to said digital words by applying an inverse discrete transform function to the reconstructed digital words.

19. A decoding method for the recovery of digital information from a coded signal, said digital information representing analog audio signals, comprising
    reconstructing with a fixed number of bits one or more digital words corresponding to at least the lowest frequency spectral component of said analog audio signals, and reconstructing one or more digital words with a fixed number of bits and an adaptive number of bits, and
    generating signal sample blocks in response to said digital words.

20. A decoding method according to claims 18 or 19, wherein said coded signal comprises mantissas associated with exponents, further comprising reconstructing a plurality of digital words from a plurality of mantissas sharing an exponent.

21. A decoding method according to claims 18 or 19 further comprising reconstructing any missing sign bit for any of said digital words comprising a normalized mantissa uniquely associated with an exponent.

22. A decoding method according to claim 20, wherein said analog audio signals represent a plurality of audio channels, each digital word in said plurality of digital words corresponding to a respective one of said plurality of audio channels, further comprising generating a plurality of signal sample blocks in response to said plurality of digital words, each one of said plurality of signal sample blocks corresponding to digital information representing a respective one of said plurality of audio channels.

23. A system method comprising an encoding method according to claim 13 and a decoding method according to claim 18.

24. A system method comprising an encoding method according to claim 14 and a decoding method according to claim 19.

* * * * *

UNITED STATES PATENT AND TRADEMARK OFFICE
CERTIFICATE OF CORRECTION

PATENT NO. : 5,142,656
DATED : August 25, 1992
INVENTOR(S) : Fielder et al

It is certified that error appears in the above-indentified patent and that said Letters Patent is hereby corrected as shown below:

Column 13
  Line 39: insert --into-- between "ADC 201" and "DSP 202"
Column 13
  Line 53: "addresses" should be --address--
Column 14
  Line 53: "DAC and" should be --and DAC--
Column 16
  Line 23: quotation mark should be reversed
Column 21
  Line 48: quotation mark should be reversed
Column 22
  Line 35: "It" should be --If--
Column 26
  Line 34: insert --to-- after "equal"
Column 28
  Line 11: "transforms" should be --transform--
Column 28
  Line 11: "locks" should be --blocks--
Column 32
  Line 30: "of" should be --for--
Column 32
  Line 31: quotation mark should be reversed Signed and Sealed this Fourth Day of October, 1994

Attest:

BRUCE LEHMAN

*Attesting Officer*    *Commissioner of Patents and Trademarks*